(12) United States Patent
Vydiswaran et al.

(10) Patent No.: US 8,046,681 B2
(45) Date of Patent: Oct. 25, 2011

(54) TECHNIQUES FOR INDUCING HIGH QUALITY STRUCTURAL TEMPLATES FOR ELECTRONIC DOCUMENTS

(75) Inventors: V. G. Vinod Vydiswaran, Maharashtra (IN); Rupesh R. Mehta, Maharashtra (IN); Amit Madaan, Uttar Pradesh (IN)

(73) Assignee: Yahoo! Inc., Sunnyvale, CA (US)

( * ) Notice: Subject to any disclaimer, the term of this patent is extended or adjusted under 35 U.S.C. 154(b) by 926 days.

(21) Appl. No.: 11/945,749

(22) Filed: Nov. 27, 2007

(65) Prior Publication Data

US 2008/0072140 A1    Mar. 20, 2008

(51) Int. Cl.
G06F 17/00 (2006.01)

(52) U.S. Cl. .......................... 715/234; 715/255

(58) Field of Classification Search .................. 715/234, 715/235, 237, 241, 209, 243, 273, 255
See application file for complete search history.

(56) References Cited

U.S. PATENT DOCUMENTS

| | | | | |
|---|---|---|---|---|
| 5,802,518 | A * | 9/1998 | Karaev et al. ........................ | 1/1 |
| 5,999,929 | A | 12/1999 | Goodman | |
| 6,069,630 | A * | 5/2000 | Lisle et al. ..................... | 715/804 |
| 6,119,124 | A | 9/2000 | Broder et al. | |
| 6,178,461 | B1 | 1/2001 | Chan et al. | |
| 6,182,085 | B1 | 1/2001 | Eichstaedt et al. | |
| 6,208,986 | B1 * | 3/2001 | Schneck et al. ....................... | 1/1 |
| 6,487,555 | B1 | 11/2002 | Bharat et al. | |
| 6,523,026 | B1 | 2/2003 | Gillis | |
| 6,556,997 | B1 * | 4/2003 | Levy ..................... | 1/1 |
| 6,629,097 | B1 | 9/2003 | Keith | |
| 6,654,741 | B1 | 11/2003 | Cohen et al. | |
| 6,658,423 | B1 | 12/2003 | Pugh et al. | |
| 6,895,552 | B1 | 5/2005 | Balabanovic et al. | |
| 7,039,860 | B1 * | 5/2006 | Gautestad ..................... | 715/205 |
| 7,098,815 | B1 | 8/2006 | Samuels et al. | |
| 7,149,347 | B1 * | 12/2006 | Wnek .......................... | 382/159 |
| 7,246,311 | B2 * | 7/2007 | Bargeron et al. ............. | 715/251 |
| 7,281,018 | B1 | 10/2007 | Begun et al. | |
| 7,363,311 | B2 | 4/2008 | Fujita et al. | |
| 7,401,071 | B2 * | 7/2008 | Hattori et al. ......................... | 1/1 |
| 7,406,660 | B1 | 7/2008 | Sikchi et al. | |
| 7,440,968 | B1 | 10/2008 | Oztekin et al. | |
| 7,484,180 | B2 * | 1/2009 | McCormack et al. ........ | 715/764 |
| 7,599,931 | B2 | 10/2009 | Shi et al. | |
| 7,660,810 | B2 * | 2/2010 | Gautestad .............. | 707/999.102 |
| 7,676,465 | B2 * | 3/2010 | Poola ..................... | 707/999.005 |
| 2002/0159642 | A1 | 10/2002 | Whitney | |
| 2003/0140033 | A1 | 7/2003 | Lizuka et al. | |
| 2003/0187837 | A1 | 10/2003 | Culliss | |
| 2004/0122686 | A1 | 6/2004 | Hill et al. | |
| 2004/0177015 | A1 | 9/2004 | Galai et al. | |

(Continued)

Primary Examiner — Laurie Ries
(74) Attorney, Agent, or Firm — Hickman Palermo Truong & Becker LLP

(57) ABSTRACT

Techniques are disclosed herein to automatically learn a template that describes a common structure present in documents in a training set. The structure of the template is compared to the structure of the documents (or at least a part of each document) in the training set, one-by-one, and generalized in response to differences between the template and the document to which the template is currently being compared. If the structure of any particular document is considered too dissimilar from the structure of the template, then the template is not modified. Various generalization operators are added to the template to generalize the template. One such generalization operator is an "OR", which indicates that only one of "n" sub-trees below the "OR" operator in the template is allowed at the corresponding position in a document.

21 Claims, 18 Drawing Sheets

U.S. PATENT DOCUMENTS

| | | |
|---|---|---|
| 2004/0260676 A1 | 12/2004 | Douglis et al. |
| 2005/0004910 A1 | 1/2005 | Trepess |
| 2005/0010599 A1 | 1/2005 | Kake et al. |
| 2005/0033733 A1 | 2/2005 | Shadmon et al. |
| 2005/0055365 A1 | 3/2005 | Ramakrishnan et al. |
| 2005/0065967 A1* | 3/2005 | Schuetze et al. ............. 707/102 |
| 2005/0267915 A1 | 12/2005 | Zhulong et al. |
| 2006/0041635 A1 | 2/2006 | Alexander et al. |
| 2006/0064471 A1 | 3/2006 | Hewett et al. |
| 2006/0123230 A1 | 6/2006 | Hewett et al. |
| 2006/0195297 A1 | 8/2006 | Kubota et al. |
| 2006/0218143 A1 | 9/2006 | Najork |
| 2007/0050338 A1 | 3/2007 | Strohm et al. |
| 2007/0094615 A1 | 4/2007 | Endo et al. |
| 2007/0130318 A1 | 6/2007 | Roast |
| 2008/0010291 A1* | 1/2008 | Poola et al. ...................... 707/10 |
| 2008/0010292 A1* | 1/2008 | Poola .............................. 707/10 |
| 2008/0044016 A1 | 2/2008 | Henzinger |
| 2008/0046441 A1* | 2/2008 | Wen et al. ..................... 707/100 |
| 2008/0072140 A1* | 3/2008 | Vydiswaran et al. ......... 715/243 |
| 2008/0114800 A1 | 5/2008 | Gazen et al. |
| 2008/0134220 A1 | 6/2008 | Weiss et al. |
| 2008/0162541 A1 | 7/2008 | Oresic et al. |
| 2008/0281816 A1 | 11/2008 | Kim |
| 2009/0019386 A1* | 1/2009 | Sweetland et al. ............ 715/765 |
| 2009/0024606 A1 | 1/2009 | Schilit et al. |
| 2009/0043797 A1 | 2/2009 | Dorie et al. |
| 2009/0063538 A1 | 3/2009 | Chitrapura et al. |
| 2009/0070872 A1 | 3/2009 | Cowings et al. |
| 2009/0157644 A1 | 6/2009 | Gollapudi et al. |
| 2009/0164411 A1 | 6/2009 | Dasdan et al. |
| 2009/0171986 A1 | 7/2009 | Chitrapura et al. |
| 2009/0182821 A1 | 7/2009 | Allen et al. |
| 2010/0161717 A1 | 6/2010 | Albrecht et al. |
| 2010/0169311 A1 | 7/2010 | Tengli et al. |
| 2010/0169329 A1 | 7/2010 | Frieder et al. |
| 2010/0185684 A1 | 7/2010 | Madaan |
| 2010/0198864 A1 | 8/2010 | Ravid et al. |
| 2010/0223214 A1 | 9/2010 | Kirpal et al. |
| 2010/0287466 A1 | 11/2010 | Ravid et al. |

* cited by examiner

Generalized Template

TECHNIQUES FOR INDUCING HIGH QUALITY STRUCTURAL TEMPLATES FOR ELECTRONIC DOCUMENTS

CROSS REFERENCE TO RELATED APPLICATIONS

This application is related to U.S. patent application Ser. No. 11/481,809, filed on Jul. 5, 2006, entitled "TECHNIQUES FOR CLUSTERING STRUCTURALLY SIMILAR WEB PAGES BASED ON PAGE FEATURES", the entire content of which is incorporated by reference for all purposes as if fully disclosed herein.

This application is related to U.S. patent application Ser. No. 11/481,734, filed on Jul. 5, 2006, entitled "TECHNIQUES FOR CLUSTERING STRUCTURALLY SIMILAR WEB PAGES", the entire content of which is incorporated by reference for all purposes as if fully disclosed herein.

This application is related to U.S. patent application Ser. No. 11/838,351, filed on Aug. 14, 2007, entitled "METHOD FOR ORGANIZING STRUCTURALLY SIMILAR WEB PAGES FROM A WEB SITE", the entire content of which is incorporated by reference for all purposes as if fully disclosed herein.

This application is related to U.S. patent application Ser. No. 11/938,736 filed on Nov. 12, 2007, entitled "EXTRACTING INFORMATION BASED ON DOCUMENT STRUCTURE AND CHARACTERISTICS OF ATTRIBUTES", the entire content of which is incorporated by reference for all purposes as if fully disclosed herein.

FIELD OF THE INVENTION

The present invention relates to computer networks and, more particularly, to techniques for automatically generating a template that matches a set of documents.

BACKGROUND OF THE INVENTION

1. World Wide Web—General

The Internet is a worldwide system of computer networks and is a public, self-sustaining facility that is accessible to tens of millions of people worldwide. The most widely used part of the Internet is the World Wide Web, often abbreviated "WWW" or simply referred to as just "the web". The web is an Internet service that organizes information through the use of hypermedia. The HyperText Markup Language ("HTML") is typically used to specify the contents and format of a hypermedia document (e.g., a web page).

In this context, an HTML file is a file that contains source code for a particular web page. Typically, an HTML document includes one or more pre-defined HTML tags and their properties, and text enclosed between the tags. A web page is the image or collection of images that is displayed to a user when a particular HTML file is rendered by a browser application program. Unless specifically stated, an electronic or web document may refer to either the source code for a particular web page or the web page itself. Each page can contain embedded references to images, audio, video or other web documents. The most common type of reference used to identify and locate resources on the Internet is the Uniform Resource Locator, or URL. In the context of the web, a user, using a web browser, browses for information by following references that are embedded in each of the documents. The HyperText Transfer Protocol ("HTTP") is the protocol used to access a web document and the references that are based on HTTP are referred to as hyperlinks (formerly, "hypertext links").

2. Search Engines

Through the use of the web, individuals have access to millions of pages of information. However a significant drawback with using the web is that because there is so little organization to the web, at times it can be extremely difficult for users to locate the particular pages that contain the information that is of interest to them. To address this problem, a mechanism known as a "search engine" has been developed to index a large number of web pages and to provide an interface that can be used to search the indexed information by entering certain words or phrases to be queried. These search terms are often referred to as "keywords".

Indexes used by search engines are conceptually similar to the normal indexes that are typically found at the end of a book, in that both kinds of indexes comprise an ordered list of information accompanied with the location of the information. An "index word set" of a document is the set of words that are mapped to the document, in an index. For example, an index word set of a web page is the set of words that are mapped to the web page, in an index. For documents that are not indexed, the index word set is empty.

Although there are many popular Internet search engines, they are generally constructed using the same three common parts. First, each search engine has at least one, but typically more, "web crawler" (also referred to as "crawler", "spider", "robot") that "crawls" across the Internet in a methodical and automated manner to locate web documents around the world. Upon locating a document, the crawler stores the document's URL, and follows any hyperlinks associated with the document to locate other web documents. Second, each search engine contains information extraction and indexing mechanisms that extract and index certain information about the documents that were located by the crawler. In general, index information is generated based on the contents of the HTML file associated with the document. The indexing mechanism stores the index information in large databases that can typically hold an enormous amount of information. Third, each search engine provides a search tool that allows users, through a user interface, to search the databases in order to locate specific documents, and their location on the web (e.g., a URL), that contain information that is of interest to them.

The search engine interface allows users to specify their search criteria (e.g., keywords) and, after performing a search, an interface for displaying the search results. Typically, the search engine orders the search results prior to presenting the search results interface to the user. The order usually takes the form of a "ranking", where the document with the highest ranking is the document considered most likely to satisfy the interest reflected in the search criteria specified by the user. Once the matching documents have been determined, and the display order of those documents has been determined, the search engine sends to the user that issued the search a "search results page" that presents information about the matching documents in the selected display order.

3. Structure of Web Pages

The Internet today has an abundance of data presented in HTML pages. However, it is still an arduous task to find informative content from all the other content. Many online merchants present their goods and services in a semi-structured format using scripts to generate a uniform look-and-feel template and present the information at strategic locations in the template. Identifying such positions on a page and extracting and indexing relevant information is key to the success of any data-centric application like search.

With the advent of e-commerce, most webpages are now dynamic in their content. Typical examples are products sold at discounted price that keep changing on sites between Thanksgiving and Christmas every year, or hotel rooms that change their room fares on a seasonal basis. With advertisement and user services critical for business success, it is imperative that crawled content be updated on frequent and near real-time basis.

These examples show that on the Web, especially on large sites, webpages are generated dynamically through scripts that place the data elements from a database in appropriate positions using a defined template. By understanding these templates, one could separate out the more useful information on the pages from the text put in by the script as part of the template.

4. Information Extraction Systems

Information Extraction (IE) systems are used to gather and manipulate the unstructured and semi-structured information on the web and populate backend databases with structured records. Most IE systems are either rule based (i.e., heuristic based) extraction systems or automated extraction systems. In a website with a reasonable number of pages, information (e.g., products, jobs, etc.) is typically stored in a backend database and is accessed by a set of scripts for presentation of the information to the user.

IE systems commonly use extraction templates to facilitate the extraction of desired information from a group of web pages. Generally, an extraction template is based on the general layout of the group of pages for which the corresponding extraction template is defined. One technique used for generating extraction templates is referred to as "template induction", which automatically constructs templates (i.e., customized procedures for information extraction) from labeled examples of a page's content.

While an example has been provided of using templates to extract information from web pages, templates can be used to extract information from electronic documents having other than an HTML structure. For example, templates can be used to extract information from documents structured in accordance with XML (eXtensible Markup Language).

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

Figure 1:
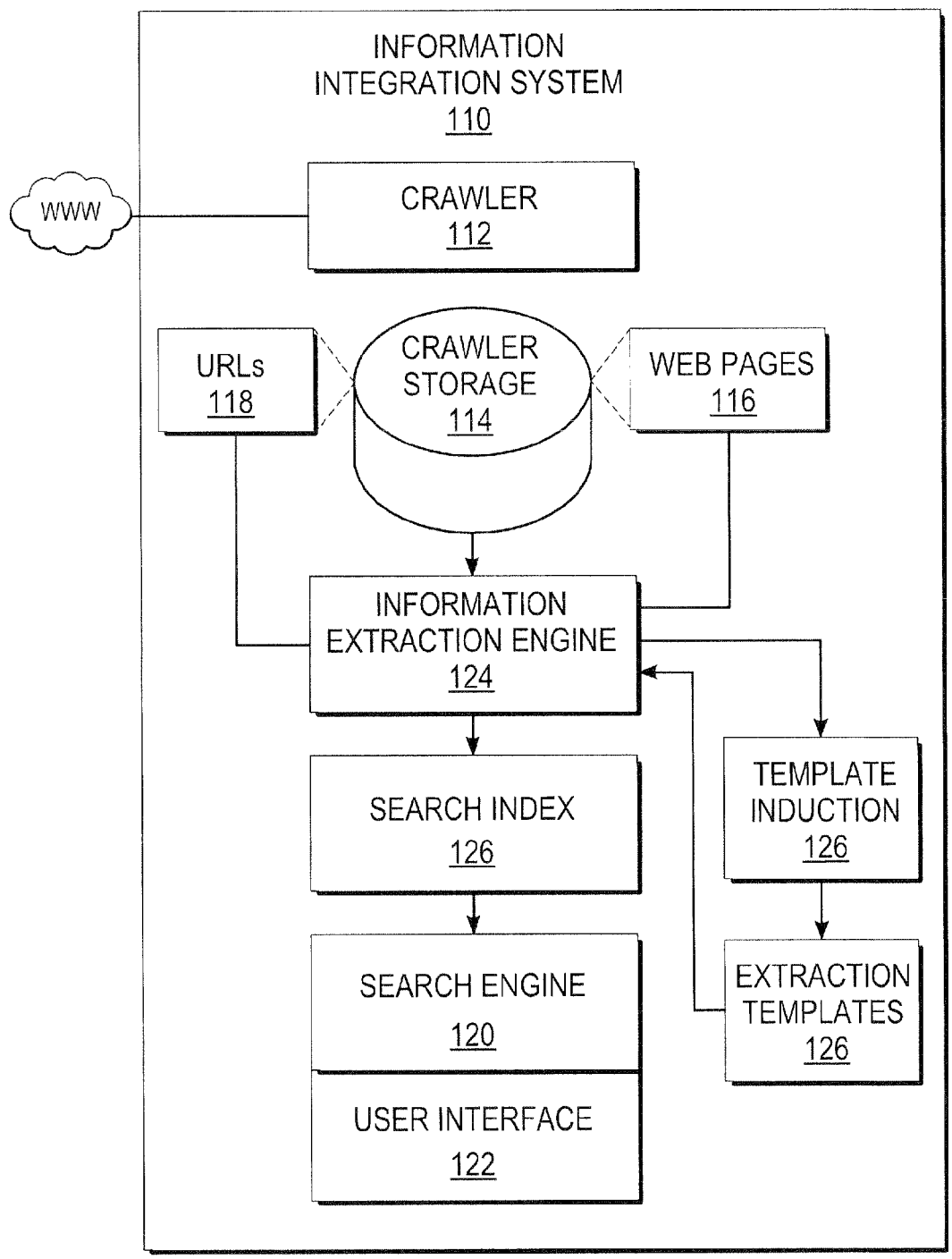
FIG. 1 is a block diagram that illustrates an Information Integration System (IIS), in which an embodiment of the invention may be implemented.

Techniques are described for automatically generating extraction templates from a training set of similarly structured documents, such as web pages coded in HTML. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments of the present invention are described in accordance with the following organization:
1) OVERVIEW
2) SYSTEM ARCHITECTURE EXAMPLE
3) GENERAL PROCESS IN ACCORDANCE WITH AN EMBODIMENT
4) TEMPLATE CREATION
  a) INITIAL TEMPLATE CREATION
  b) GENERALIZING THE INITIAL TEMPLATE
    i) IDENTIFICATION OF APPROXIMATION LOCATIONS AND BOUNDARY
5) GENERALIZING THE TEMPLATE BASED ON A TRAINING SET OF DOCUMENTS
  a) COMPARING TEMPLATE TO TRAINING SET
  b) GENERALIZING THE TEMPLATE BASED ON COMPARISON WITH TRAINING SET
    i) STAR OPERATORS
    ii) HOOK OPERATORS
    iii) OR OPERATORS iv) ADDITION OF OPERATORS ACROSS TREE LEVELS
v) COST OF GENERALIZING THE TEMPLATE
6) HARDWARE OVERVIEW

OVERVIEW

Techniques are disclosed herein to automatically learn a template that describes a common structure present in documents in a training set. In one embodiment, the training documents are selected from a cluster of structurally similar documents. The cluster can be generated by applying a clustering algorithm to a large set of documents. The documents could be HTML documents (e.g., web pages), XML documents, documents in compliance with other markup languages, or some other structured document.

In one embodiment, the template is expressed as a tree. The structure of the template is compared to the structure of the documents (or at least a part of each document) in the training set, one-by-one, and generalized in response to differences between the template and the document to which the template is currently being compared. Generalizing the template to match a particular document results in a more general template structure that will match the structure of the particular document, while preserving the template's match to documents to which the template was previously matched. Thus, the generalized template describes a common structure present in the documents in the training set.

In one embodiment, a document object model (DOM) tree is constructed for at least a portion of a document to facilitate comparison with the template. Generalizing the template is achieved by generalizing the structure of the template such that its more general structure will match the structure of the DOM for the document, in one embodiment. Various example "generalization operators" are described herein, which may be added to the template to generalize it. If the structure of any particular document is considered too dissimilar from the structure of the template, then the template is not generalized to match the particular document.

After the template is created, the template can be used to extract information from documents outside of the training set. As an example, the template could be learned from a training set of web pages associated with a shopping web site. The learned template could be used to extract information such as product descriptions, product prices, product reviews, product images, etc. Note that some portions of the documents such as banner ads may not be of interest. Thus, the template might only describe the common structure of a portion of the shopping web pages, such as the portion that pertains to the product or products for sale. Because the template can be learned in an automated fashion, templates can be learned across applications to all kinds of script generated websites. Further note that prior to using the template for extraction, there may be some additional modifications. For example, the template could be annotated with attributes that are of interest, wherein those attributes can be extracted from documents that were not used to construct the template.

SYSTEM ARCHITECTURE EXAMPLE

FIG. 1 is a block diagram that illustrates an Information Integration System (IIS), in which an embodiment of the invention may be implemented. The context in which an IIS can be implemented may vary. For non-limiting examples, an IIS such as IIS 110 may be implemented for public or private search engines, job portals, shopping search sites, travel search sites, RSS (Really Simple Syndication) based applications and sites, and the like. Embodiments of the invention are described herein primarily in the context of a World Wide Web (WWW) search system, for purposes of an example. However, the context in which embodiments are implemented is not limited to Web search systems. For example, embodiments may be implemented in the context of private enterprise networks (e.g., intranets), as well as the public network of networks (i.e., the Internet).

IIS 110 can be implemented comprising a crawler 112 communicatively coupled to a source of information, such as the Internet and the World Wide Web (WWW). IIS 110 further comprises crawler storage 114, a search engine 120 backed by a search index 126 and associated with a user interface 122.

A web crawler (also referred to as "crawler", "spider", "robot"), such as crawler 112, "crawls" across the Internet in a methodical and automated manner to locate web pages around the world. Upon locating a page, the crawler stores the page's URL in URLs 118, and follows any hyperlinks associated with the page to locate other web pages. The crawler also typically stores entire web pages 116 (e.g., HTML and/or XML code) and URLs 118 in crawler storage 114. Use of this information, according to embodiments of the invention, is described in greater detail herein.

Search engine 120 generally refers to a mechanism used to index and search a large number of web pages, and is used in conjunction with a user interface 122 that can be used to search the search index 126 by entering certain words or phases to be queried. In general, the index information stored in search index 126 is generated based on extracted contents of the HTML file associated with a respective page, for example, as extracted using extraction templates 128 generated by template induction 126 techniques. Generation of the index information is one general focus of the IIS 110, and such information is generated with the assistance of an information extraction engine 124. For example, if the crawler is storing all the pages that have job descriptions, an extraction engine 124 may extract useful information from these pages, such as the job title, location of job, experience required, etc. and use this information to index the page in the search index 126. One or more search indexes 126 associated with search engine 120 comprise a list of information accompanied with the location of the information, i.e., the network address of, and/or a link to, the page that contains the information.

As mentioned, extraction templates 128 are used to facilitate the extraction of desired information from a group of web pages, such as by information extraction engine 124 of IIS 110. Further, extraction templates 128 may be based on the general layout of the group of pages for which a corresponding extraction template 128 is defined. For example, an extraction template 128 may be implemented as an HTML file that describes different portions of a group of pages, such as a product image is to the left of the page, the price of the product is in bold text, the product ID is underneath the product image, etc. Template induction 126 processes may be used to generate extraction templates 128. Interactions between embodiments of the invention and template induction 126 and extraction templates 128 are described in greater detail herein.

Overview of Inducing a Template in Accordance with an Embodiment

Figure 2:
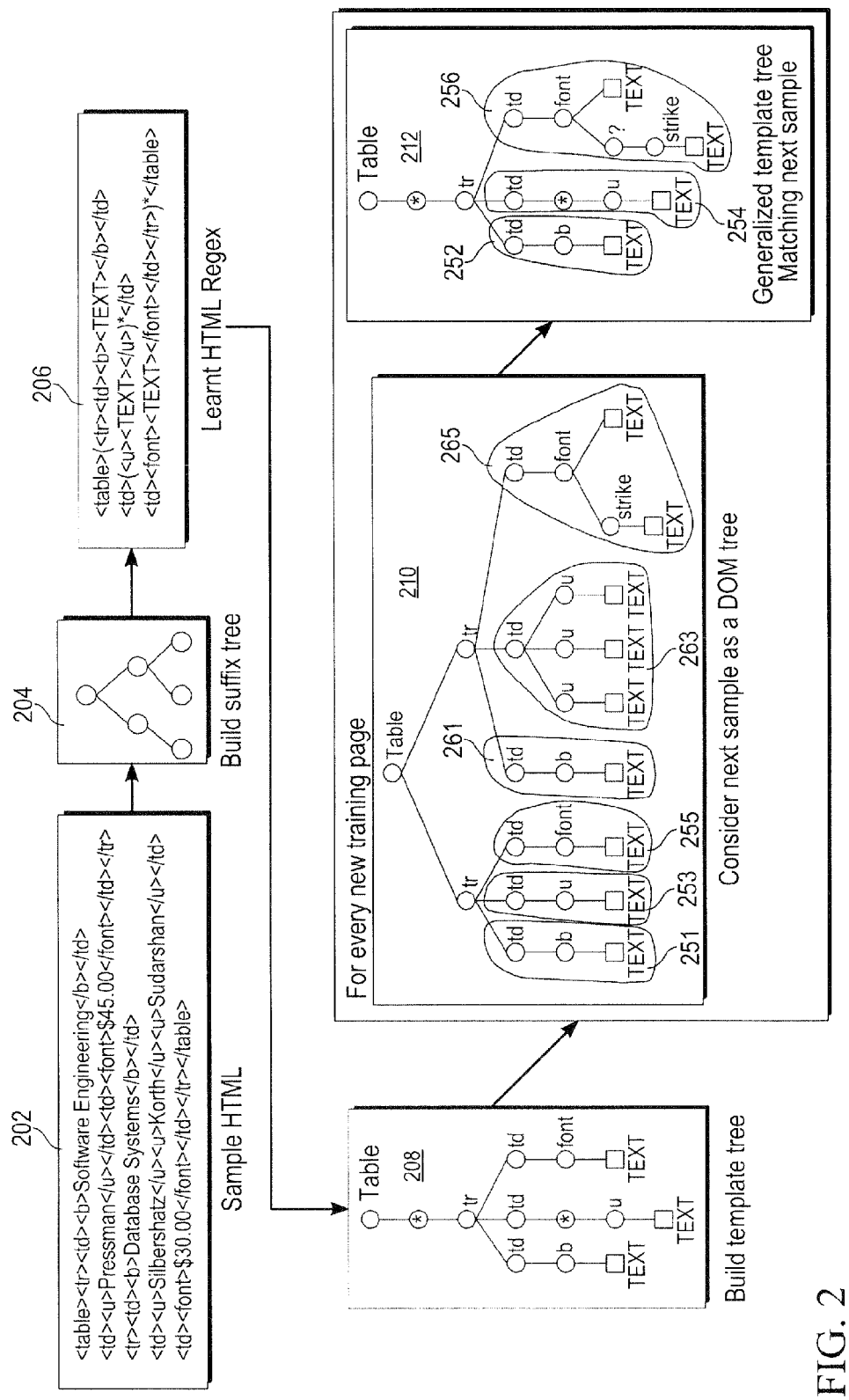
FIG. 2 depicts a diagram of automatically creating and generalizing a template, in accordance with an embodiment of the present invention.

The diagram in FIG. 2 illustrates an overview of automatically creating and generalizing a template, in accordance with an embodiment of the present invention. In general, first an initial template is created. Then, the initial template is generalized by comparing the template to a set of training documents. In particular, the template is compared to a DOM for at least a portion of each of the training documents. Thus, herein the phrase "comparing the template to a DOM", and other similar phrases, refers to comparing the structure of the template to the structure of a DOM that models at least a portion of a document. The initial template is created based on sample HTML 202, in an embodiment. For example, if the goal is to build a template that is suitable for shopping web sites, a relevant portion of a shopping page could be input.

In this embodiment, a suffix tree 204 is created from the sample HTML 202. A suffix tree 204 is a data-structure that represents suffixes starting from all positions in the sequence, S. The suffix-tree 204 can be used to identify continuous-repeating patterns. However, a structure other than a suffix tree 204 can be used to identify patterns. The suffix tree 204 is analyzed to generate a regular expression ("Regex") HTML 206. Further details of creating a suffix tree 204 and a regex are discussed below under the heading "initial template creation."

An initial template 208 is generated from the regex 206. In one embodiment, a template includes HTML nodes and nodes corresponding to defined operators. An example of an HTML node is an HTML tag (e.g., title, table, tr, td, h1, h2, p, etc.). Examples of defined operators include, but are not limited to, STAR, HOOK, and OR. A STAR operator indicates that any subtrees that stem from children of the STAR operator are allowed to occur one or more times in the DOM. A HOOK operator indicates that the underlying subtrees are optional. In one embodiment, a HOOK operator is allowed to have only one underlying subtree. In other words, a HOOK operator is allowed to have only a single child, in one embodiment. An OR operator in the template indicates that only one of the sub-trees underlying the OR operator is allowed to occur at the corresponding position in the DOM. It is not required that the template contain HTML nodes. In one embodiment, the template includes XML nodes and nodes corresponding to defined operators.

Box 210 depicts an example DOM structure for a document in the training set. Box 212 depicts a generalized version of the template 212, which is automatically generated in accordance with an embodiment. As previously mentioned, the template is generalized such that its structure matches that of a common structure of the training documents. To generalize the template 212 to match a particular DOM structure 210, first the template 212 is compared to the DOM 210 to determine what are the differences. Differences are resolved by adding one or more operators to the template 212, which results in matching the template 212 to the current DOM 210 by making the template 212 more general. The changes to the template 212 are made in such a way that the template 212 will still match with DOMs 210 for which the template 212 was previously generalized to match.

TEMPLATE CREATION

A) Initial Template Creation

Figure 3:
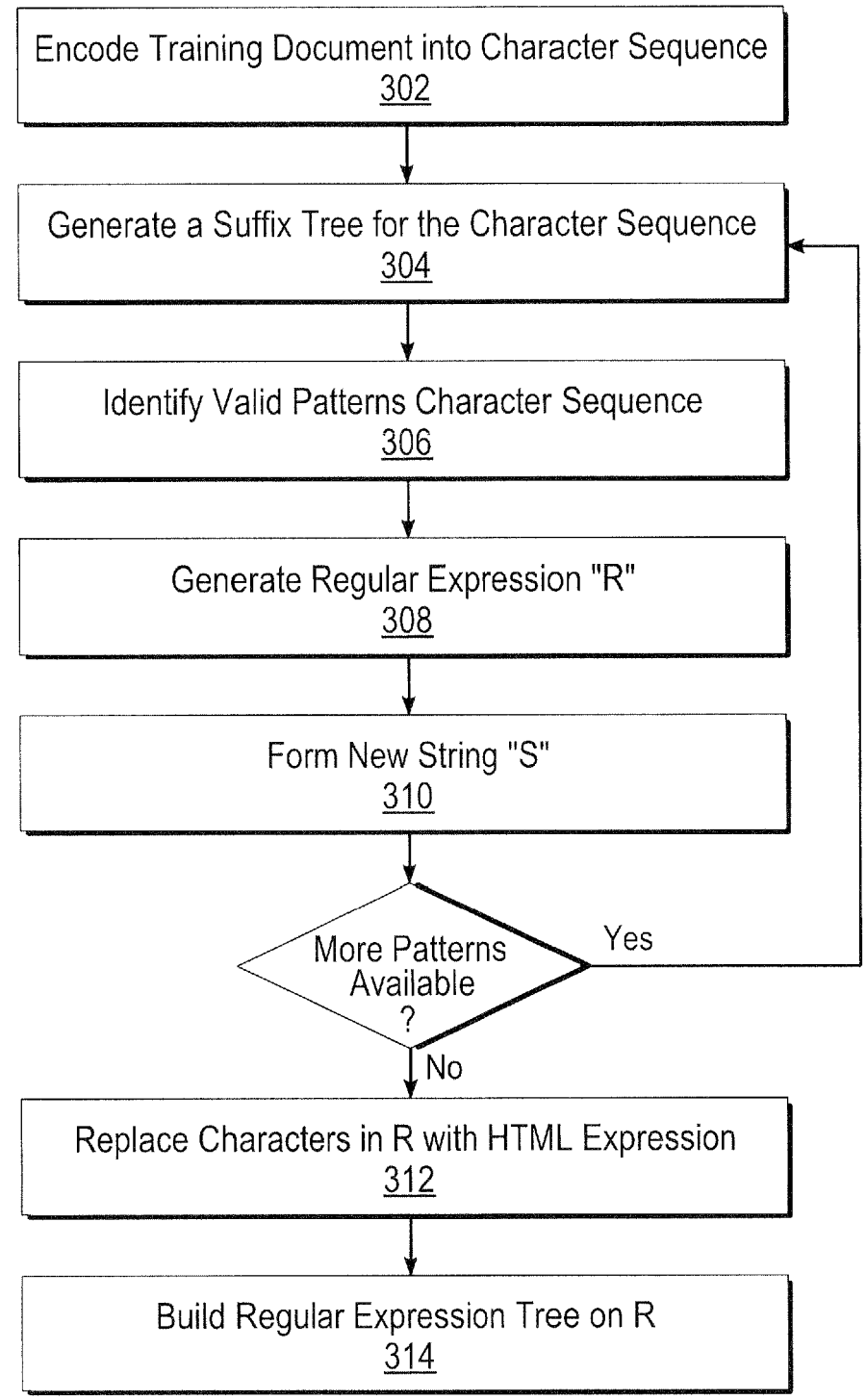
FIG. 3 depicts a flowchart illustrating initial template creation, in accordance with an embodiment.

The following section describes initial creation of a template, in accordance with one embodiment. FIG. 3 depicts a flowchart illustrating a process 300 of initial template creation, in accordance with an embodiment. In step 302, a training document (e.g., HTML page) is encoded into a character sequence, $S=s_1 s_2 \ldots s_n$. In an embodiment, all text outside of HTML tags is encapsulated into a special <TEXT> token. For example, the text that describes an item for sale on a shopping site web page would be represented as a TEXT token. The HTML tags themselves are also represented as tokens. For example, there could be a TABLE token, a TABLE ROW token, etc. Then, each token is mapped to a character $s_i$ (or a unique group of characters $s_i \ldots s_k$, if required).

Figure 4:
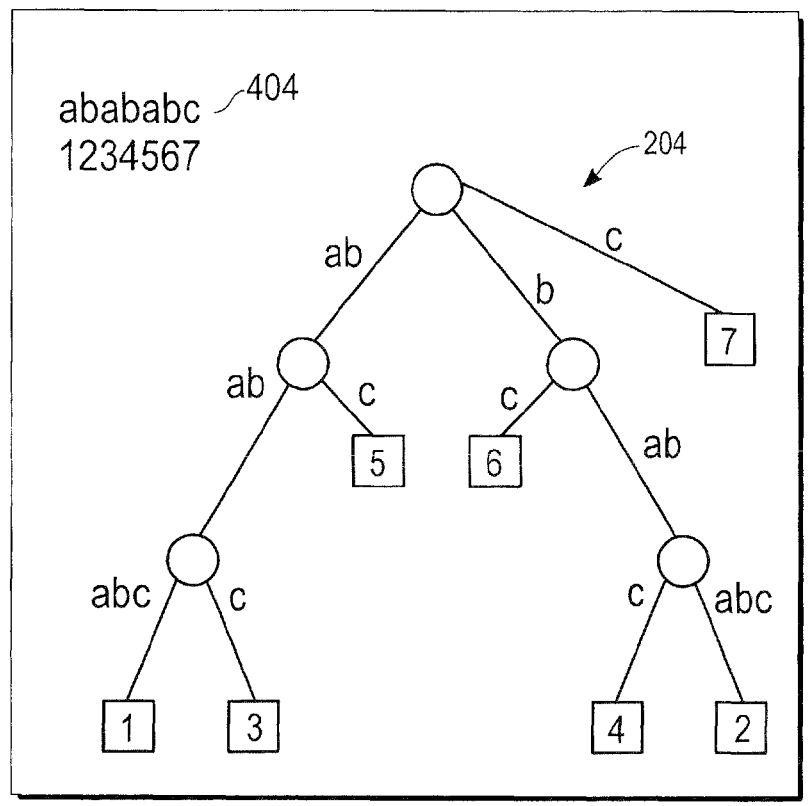
FIG. 4 depicts an example suffix tree created in accordance with an embodiment of the present invention.

In step 304, a suffix-tree is built on the character sequence "S." FIG. 4 depicts an example suffix tree 204, in accordance with an embodiment. The example suffix tree 204 reflects patterns in the character sequence 404. The patterns may be identified by analyzing sub-strings within the character sequence 404. As an example of continuous-repeating patterns, in FIG. 4 "ab" (starting at position 1 and position 3) in the character sequence 404 and "ba" (starting at position 2 and position 4) are identified as repeating patterns. The pattern "abc" starting at position 5 is an example of a pattern that is not repeated.

In step 306, valid patterns are identified. For example, certain tags should have an "open" tag followed, at some point, by a "close" tag. As a particular example, a "bold open tag" should precede a "bold close tag". This required sequence of tags can be used to identify patterns that are valid and invalid and more prominent in the neighborhood.

In step 308, a regular expression, "R", is constructed. Step 308 includes several sub-steps including replacing multiple occurrences in the suffix tree with a single occurrence. As an example, the suffix tree has multiple occurrences of "ab", which are replaced by a single occurrence "ab*", where the "*" indicates that pattern occurs more than once in the suffix tree. For example, from the character sequence S, a regular expression R is constructed by replacing multiple occurrences of a pattern in S by an equivalent regular expression. In the example from FIG. 4, "ababab" in S is replaced by "(ab)*". Thus, from S="ababab", generate R="(ab)*c". The suffix tree is used to find these multiple occurrences, but does not store the regular expression.

In step 310, another string, S', is formed. The new string S' is formed by neglecting all of the patterns in R having a "*" character, in an embodiment.

Steps 304-310 are repeated on S' to find more complex and nested patterns. Steps 304-310 may be repeated until no more patterns are available. At the end of this phase, a regular expression, R, is available with multiple occurrences replaced by a starred-single occurrence.

In step 312, all characters in R are replaced by their equivalent HTML tag from step 302.

Figure 5:
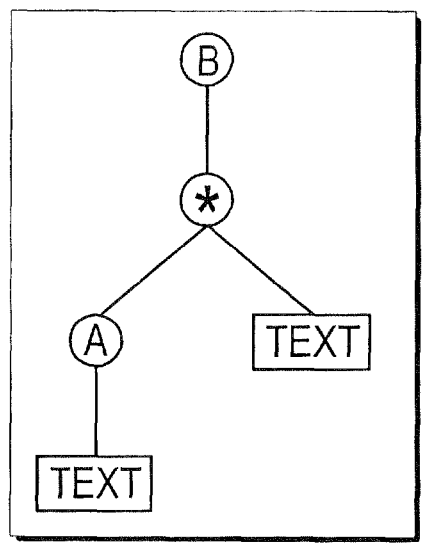
FIG. 5 depicts an example regular expression (regex) tree created in accordance with an embodiment of the present invention.

In step 314, a regular-expression tree is built on R, such that any nested HTML tag is represented as a hierarchy. FIG. 5 shows an portion of an example regular-expression tree for the following expression:

<B>(<A><TEXT></A><TEXT>)*</B>

A full regular expression tree serves as the basis for an initial template to be used to compare with documents in a training set, in one embodiment. However, as is discussed in the next section, the initial template can be generalized prior to comparing the template to training documents.

B) Generalizing the Initial Template

Figure 6A:
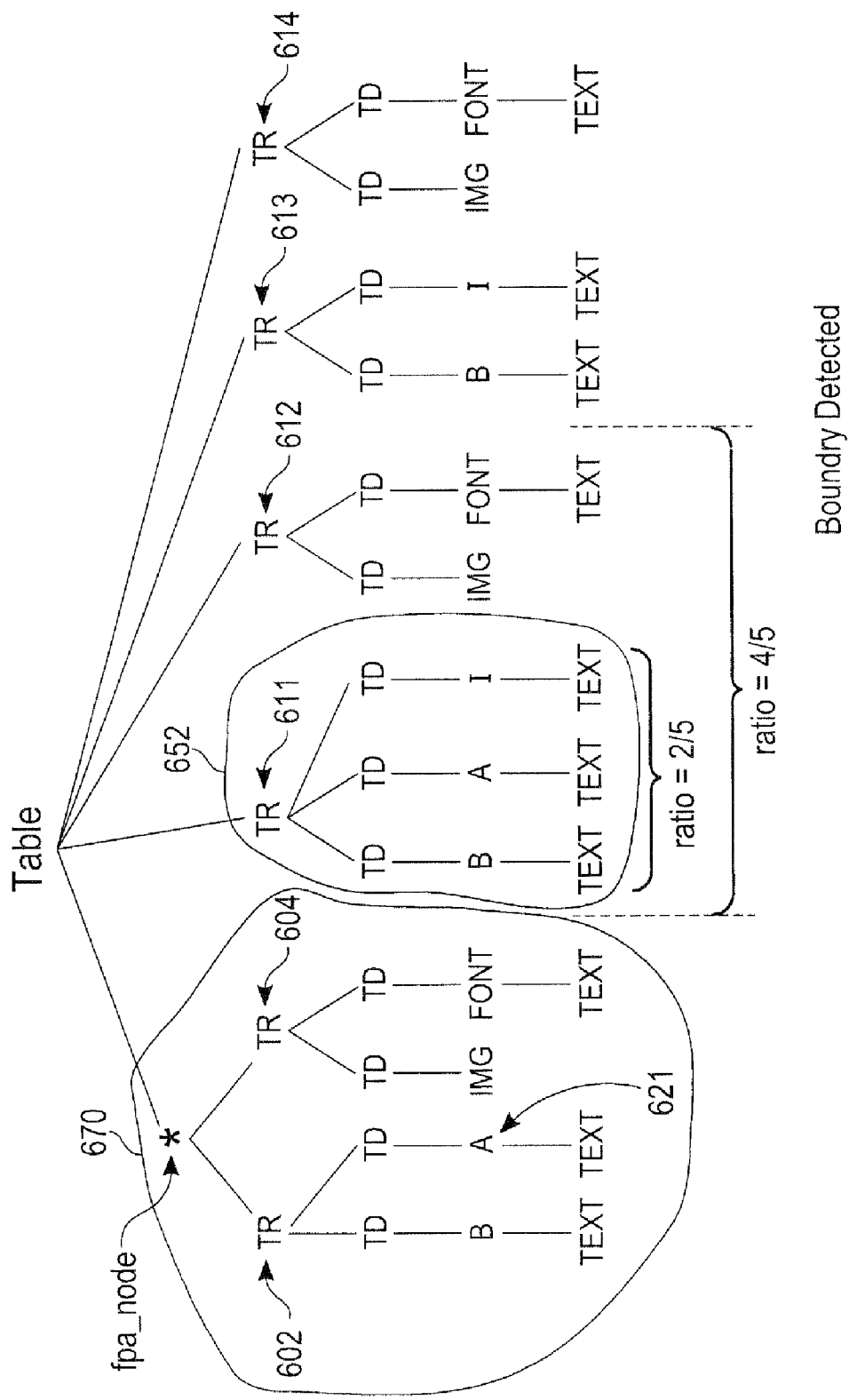
FIG. 6A, FIG. 6B, and FIG. 6C depict examples of generalizing a template, in accordance with an embodiment.

After initial creation, the template may have sub-trees that are approximately, although not exactly, the same. As an example, FIG. 6A shows a node "fpa_nde" that has a sub-tree formed from the nodes 602, 604 and their children. There are also sub-trees formed from each of nodes 611, 612, 613, 614, and their respective children. Note that there is some similarity in the sub-trees. As the previous section describes, sub-trees that are identical are merged and the "STAR" operator is used to indicate that more than one sub-tree is represented. The following generalization process is used to merge sub-trees that are substantially similar, but not identical.

In one embodiment, similar sub-trees in the template are merged and generalized using a similarity function on the paths of the template. In an embodiment, this generalization process involves two phases: i) identification of approximation locations and boundary; and ii) approximation methodology.

i) Identification of Approximation Locations and Boundary

Initially, a set of candidate nodes in the template are identified for a determination as to whether a sub-tree of a particular candidate node has a similar sub-trees. For example, all STAR nodes are considered candidate nodes. The sub-tree associated with a particular STAR node may be compared with the sibling sub-trees of the same STAR nodes to look for similar sub-trees. The candidate nodes do not have to be STAR nodes, but could be any set of nodes. Typically, the candidate nodes will be the same type of nodes. In the following discussion, the template node whose sub-tree is under consideration for similar sub-trees is referred to as "fpa_node."

A modified similarity function is used to find the boundary of match, in an embodiment. Initially, all "paths" within the selected template node, fpa_node, are determined. A path from an arbitrary node "p" is defined as a series of HTML tags starting from node p to one of the leaf nodes under node p.

Figure 6B:
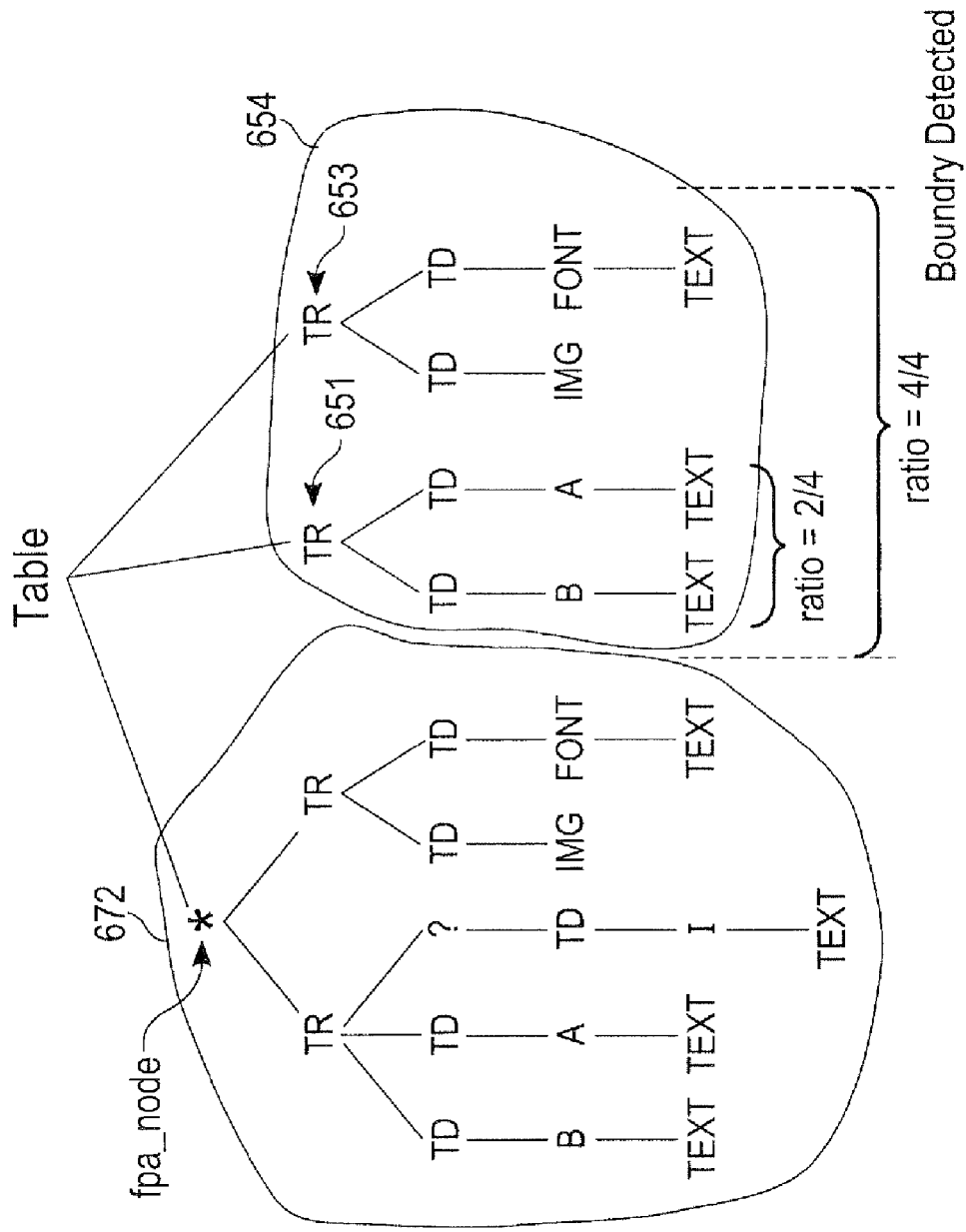
Figure 6C:
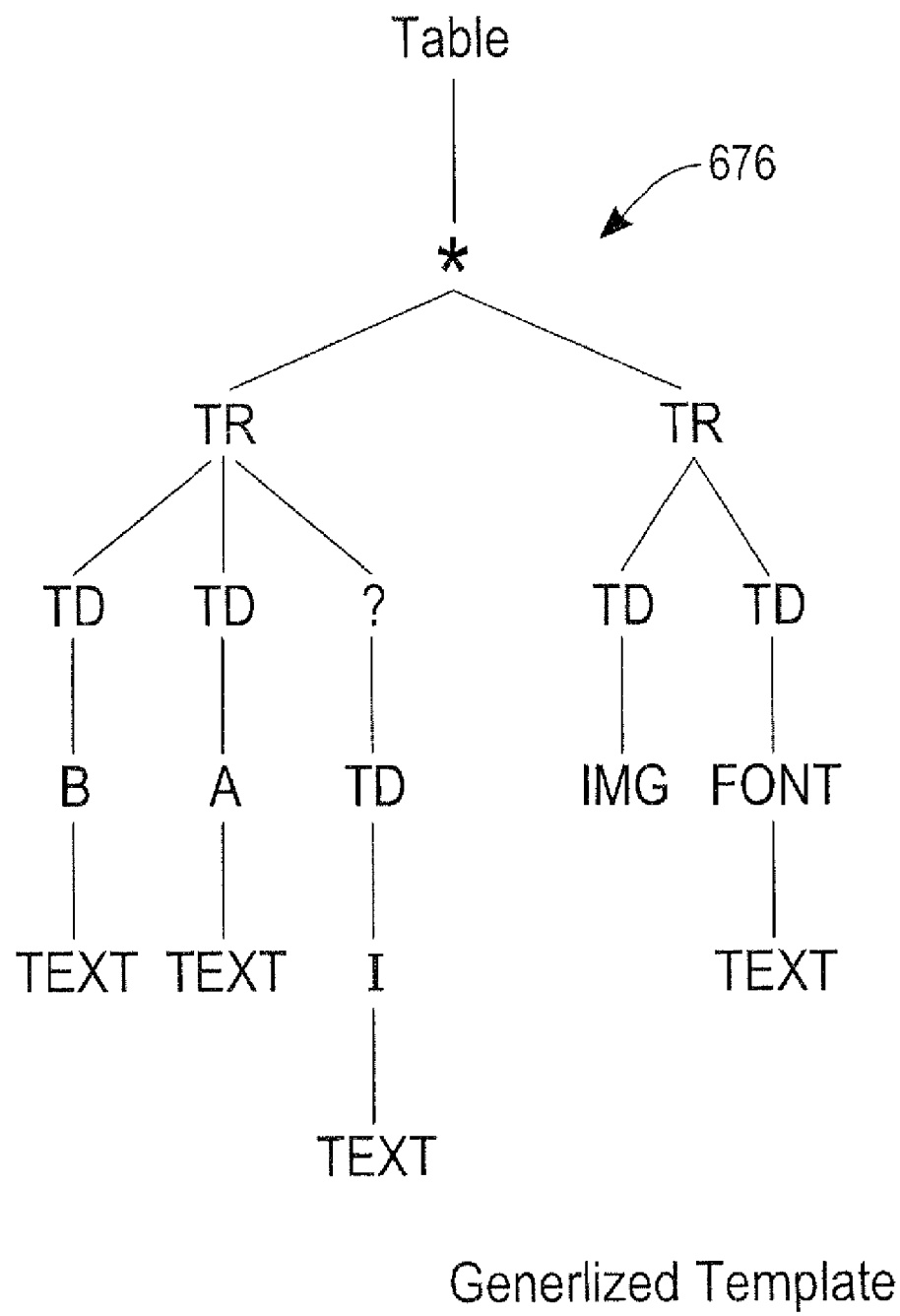

The following example with respect to FIG. 6A, FIG. 6B, and FIG. 6C will be used to illustrate. First, all "paths" within the selected template node fpa_node are determined. These will be referred to as "fpa_node paths". A path from a node p is defined as a series of HTML tags starting from p to one of the leaf nodes under p, in an embodiment. Hence, the fpa node paths in FIG. 6A are: tr/td/B/TEXT, tr/td/A/TEXT, tr/td/IMG, and tr/td/FONT/TEXT.

Next, paths are computed for the siblings of fpa_node. These will be referred to as "sibling paths". For example, sibling 611 has three sibling paths. The computed sibling paths are compared to the fpa_node paths to look for path matches. A path match occurs when a fpa_node path matches a sibling path, in an embodiment. In the following discussion, the "current sibling" refers to the sibling whose paths are currently being compared to the fpa_node paths. Based on the number of matching paths, a similarity score is computed, in an embodiment. The numerator is the number of fpa_node paths that have a match in the sibling paths. The denominator is the number of unique fpa_node paths and all sibling paths up until the current sibling. For example, referring to FIG. 6A, the ratio of matching paths from fpa_node paths to sibling nodes 611 and 612 is 2/5 and 4/5 respectively. Herein, the ratio will be referred to as a "similarity score".

If the current similarity score is at least a specified threshold, that sibling node is considered to be a "boundary". As an example, if the threshold were 1/3, then sibling node 611 would be considered to be a boundary.

However, if current similarity score is not at least the specified threshold, then the paths from the next sibling node are combined and a similarity score is computed. Referring to FIG. 6A, the paths of siblings 611 and 612 are combined and the similarity score of sibling paths and the fpa_node paths is 4/5. In one embodiment, if the similarity score is greater than the specified threshold, the siblings are considered to be candidates for merging (in other words, a boundary has been found). If in FIG. 6A, the similarity score (4/5) up to template node 612 is greater than the specified threshold (say 3/4), template node 612 is called as "boundary" node. In one embodiment, the range of the siblings up until the boundary node is considered for merging.

If there is a HOOK node present in a path under the fpa_node, then the HOOK node is only considered if there is a path under a sibling set that matches this "optional path", in an embodiment.

Paths containing OR are weighed against each other such that the presence of any one of them is treated as a presence of the entire set, in an embodiment. For example, if there are three children to an OR node, then there will be at least three paths through this OR node—one through each of these three children. Note that there may be more than three paths if these children have a sub-tree below them; however, to facilitate explanation this example assumes there are only three paths. Because an OR node mandates that only one of each of the three paths is allowed, then if any one of this set of three paths is present in the sibling's paths, the entire set is treated as present, in an embodiment. Thus, a count of one is added to the numerator and denominator of the ratio fraction, if at least one of the paths under the OR node matches. Otherwise, a count of one is added only to the denominator.

Once merging happens successfully, the process is repeated for remaining sibling sub-trees. The merging is called "successful", if the cost of modifying template is less than a cost threshold, otherwise merging is called "failed". For example, the sub-trees associated with siblings 611 and 612 from FIG. 6A are merged with the sub-tree under the fpa_node shown in FIG. 6B. The merging is performed by generalizing the sub-tree under the fpa_node such that it matches with the sub-trees associated with siblings 611 and 612. Details of generalizing a template are described below. After the merging, the sub-trees under siblings 651 and 653 are considered for merging with the sub-tree under the fpa_node, as shown in FIG. 6B.

Once the boundary is identified, the template is generalized based on the segments. In an embodiment, generalizing the template based on the segments is performed using techniques discussed herein under the heading "GENERALIZING THE TEMPLATE BASED ON A TRAINING SET OF DOCUMENTS." That section describes how a template can be generalized to match a single training document or partial document sub-tree. In the present example of generalizing the initial template, a portion of the template, referred to herein as a template component 670, is matched to other portions of the template, referred to herein as template segments or sub-trees. That is, template sub-trees corresponding to segments in the template are matched with the template component 670 to generalize the template component 670. In particular, first the template component 670 is generalized to match the first template segment 652, as shown in FIG. 6A, which results in the modified template component 672 as shown in FIG. 6B. Then, the modified template component 672 is generalized to match the second template segment 654, as shown in FIG. 6B, which results in the generalized template component 676, as shown in FIG. 6C. By generalizing the template component (or portion thereof) to match a template segment it is meant that a comparison of the generalized template component with the template segment will not have any mismatches when applying a set of rules that determine whether the generalized template component matches the template segment.

GENERALIZING THE TEMPLATE BASED ON A TRAINING SET OF DOCUMENTS

A) Comparing Template to Training Set

The template includes either HTML nodes or nodes corresponding to one of the defined operators (e.g., STAR, HOOK, OR), in an embodiment. FIG. 2 depicts an example of a HOOK operator that has been added to a template, in accordance with an embodiment. The STAR operator is represented by '*', and the HOOK operator is represented by '?'.

Given a new document for learning, the DOM of the document is matched with the template in a depth first fashion, in an embodiment. By depth first, it is meant that processing proceeds from a parent node to the leftmost child node of the parent. After processing all of the leftmost child's subtrees in a depthmost fashion, the child to the right of the leftmost child is processed. When there is a mismatch between tags, a mismatch routine is invoked in order to determine whether to match the template to the DOM.

Comparing the template to the DOM depends on the type of operator that is the parent of a sub-tree in the template, in an embodiment. For example, if a STAR operator is encountered in the template, then the sub-tree of the STAR operator is compared to the corresponding portion of the DOM in accordance with STAR operator processing, as described below. Sub-trees having a HOOK operator or an OR operator as a parent node are processed in accordance with HOOK operator processing and OR operator processing respectively, in accordance with an embodiment.

Star Node Processing

Processing of a sub-tree under a STAR node in the template occurs by traversing the nodes in the sub-tree in a depthmost fashion, comparing the template nodes with the DOM nodes. If all children match at least once, then the STAR sub-tree matches the corresponding sub-tree in the DOM. As an example, referring to FIG. 2, the leftmost "tr" node in the DOM 210 matches the STAR subtree in the template as follows. Sub-tree 251 matches sub-tree 252. Then sub-tree 253 is compared to sub-tree 254, wherein it is determined that these paths match. Note that sub-tree 254 itself contains a STAR node, which could result in the routine that processes STAR subtrees to be recursively invoked. Further note that since sub-tree 254 has at least one instance of u/text, sub-tree 254 matches with sub-tree 253. Sub-tree 255 matches sub-tree 256 because each have td/font/text. A routine could be invoked to evaluate the HOOK path in the subtree. Because the HOOK operator indicates that the subtree below the HOOK is optional, the DOM is not required to have that subtree in order to match.

After processing the leftmost subtree in the DOM 210, the rightmost subtree is compared to the template subtree 212, again because template contains a STAR node. Sub-tree 261 matches sub-tree 252. Sub-tree 263 contains three instances of td/u/text. Because of the STAR operator in sub-tree 254, the sub-trees match. That is, the DOM 210 is allowed to have one or more sub-trees td/u/text and be considered a match. Sub-tree 265 matches sub-tree 256. Note that sub-tree 256 has the optional path td/font/strike/text path.

Figure 15A:
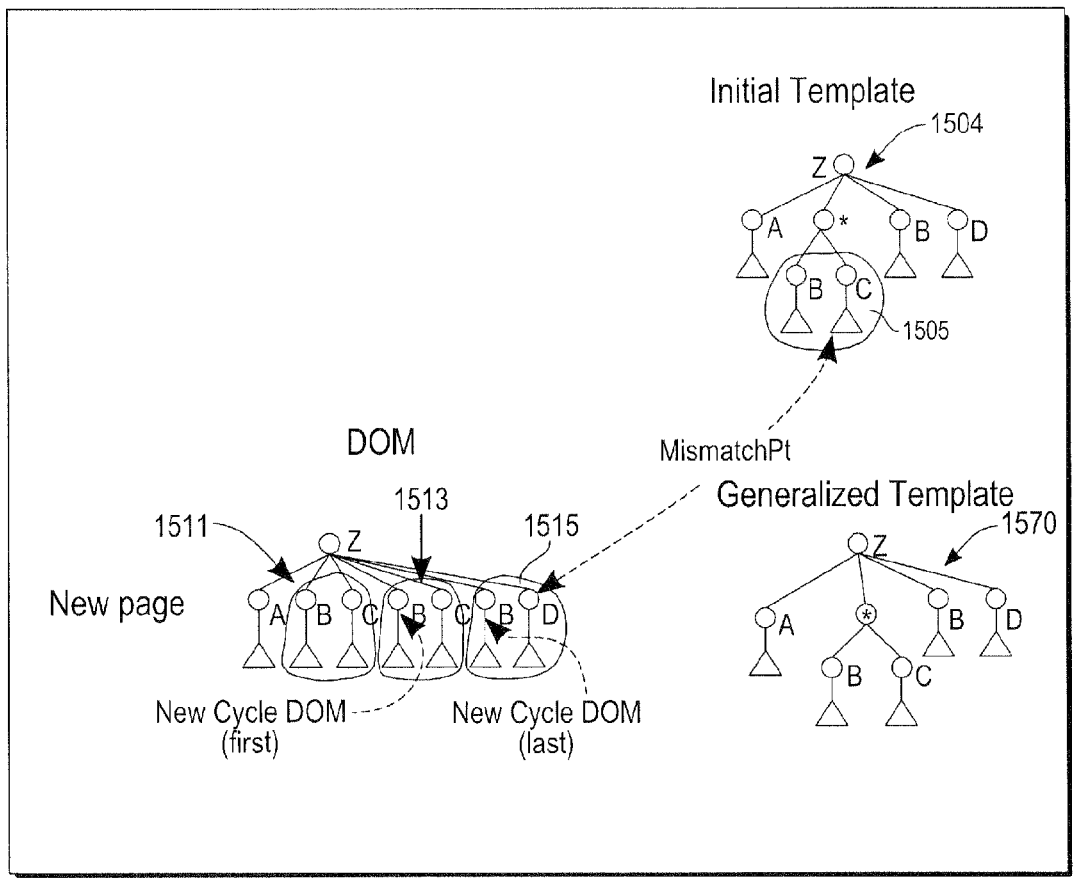
FIG. 15A and FIG. 15B depict diagrams that illustrate matching and generalizing a template having a STAR operator, in accordance with an embodiment.
Figure 15B:
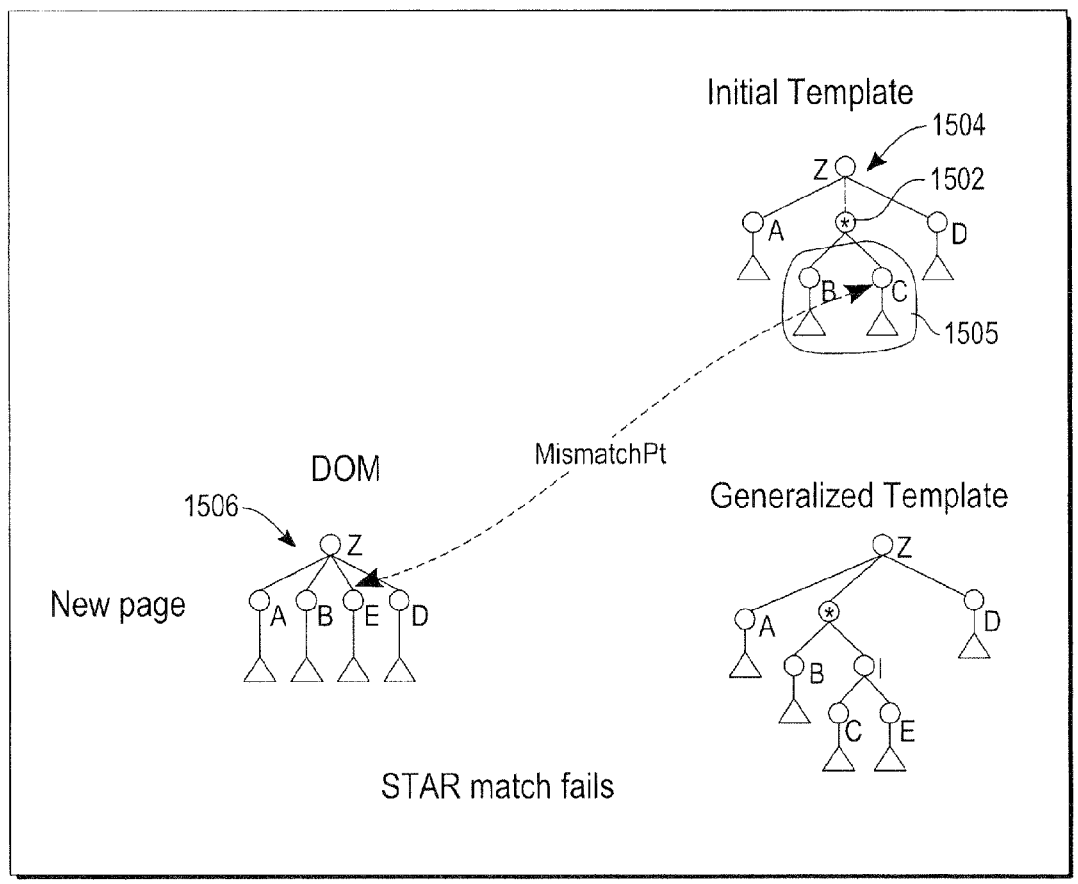

FIG. 15A and FIG. 15B will be used to illustrate how mismatches between the template STAR sub-tree and the DOM may be handled, in accordance with an embodiment. As previously discussed, the subtree under a STAR node may be present in the DOM more than one time. Processing depends on whether all of the children of the STAR node have matched the DOM at least once. FIG. 15A depicts an example in which all of the children of the STAR have matched the DOM at least once. For example, DOM sub-trees 1511 and 1513 match with the STAR sub-tree 1505. FIG. 15B depicts an example in which the sub-tree 1505 of the STAR node 1502 does not match the DOM 1506 at all. For example, the A node in the DOM 1506 matches the A node in the template 1504. However, the B node and E node in the DOM 1506 do not match with the B node and the C node in the template 1504. Therefore, there is a mismatch point (mismatchPt in FIG. 15B) between the E node of the DOM 1506 and the C node of the template 1504. Moreover, the DOM 1506 does not have even one occurrence of the STAR sub-tree 1505 at the correct location.

When processing the STAR sub-tree 1505, if there is a mismatch between the STAR sub-tree 1505 and the sub-tree in the DOM under consideration for this cycle, a determination is made as to whether the STAR sub-tree 1505 has matched in the DOM at least once. If the STAR sub-tree 1505 has not matched even once, then the STAR sub-tree 1505 is said to have failed the match, and a mismatch routine is called. The mismatch routine is informed that the STAR sub-tree 1505 failed to match at all, in an embodiment. The mismatch routine is provided with the identity of the nodes which mismatched, in an embodiment. For example, referring to FIG. 15B, the E node in the DOM 1506 and the C node in the template 1504 are identified.

FIG. 15A will be used to illustrate how processing may be performed if the STAR sub-tree 1505 has matched in the DOM at least once. Note that processing the STAR sub-tree may include performing a number of cycles. For example, referring to FIG. 15A, the STAR sub-tree 1505 is compared to three different sub-trees 1511, 1513, and 1515 in the DOM. During the first cycle it is determined that DOM sub-tree 1511 matches with the STAR sub-tree 1505; therefore, matching starts again at the position indicated in FIG. 15A by newCycleDOM(first). During the second cycle it is determined that DOM sub-tree 1513 matches with the STAR sub-tree 1505; therefore, matching starts again at the position indicated in FIG. 15A by newCycleDOM(last). During the third cycle it is determined that DOM sub-tree 1515 does not match with the STAR sub-tree 1505. However, because the STAR sub-tree 1505 matched at least once, the STAR sub-tree match is successful. Processing then proceeds from the B node in newCycleDOM(last) of the DOM and the next node in the template 1504 (which is the B node). Note that the B node in the DOM did have a match in the template sub-tree 1505. However, processing begins at B node because the entire STAR sub-tree 1505 was not matched for that cycle. Thus, the matching routine is restarted with the DOM node that was used for matching the first child (leftmost child) in the sub-tree 1505 under the STAR node 1502. Since the template 1504 matches completely with the DOM, it remains unchanged after matching.

In the current examples, the STAR node 1502 had a sibling to its right. That is, the STAR node 1502 and the D node are both children of the Z node, in FIG. 15B. If a STAR node has no right sibling nodes, the matching may proceed with the next node in the template 1504 at the same logical level in the template 1504 as the STAR node 1502. When determining a logical level in a template, the presence of an operator node is not considered as a logical level. In a template, two nodes $n_1$ and $n_2$ are considered to be in the same logical level if they have a common non-operator ancestor N, and all nodes between N and $n_1$, and N and $n_2$ are operator nodes. If no node is found to the right of the STAR node 1502, the mismatch routine may be called on the current template and DOM nodes. By the current template and DOM nodes it is meant the nodes at which the mismatch point (mismatch Pt) occurred.

Hook Node Processing

Figure 7:
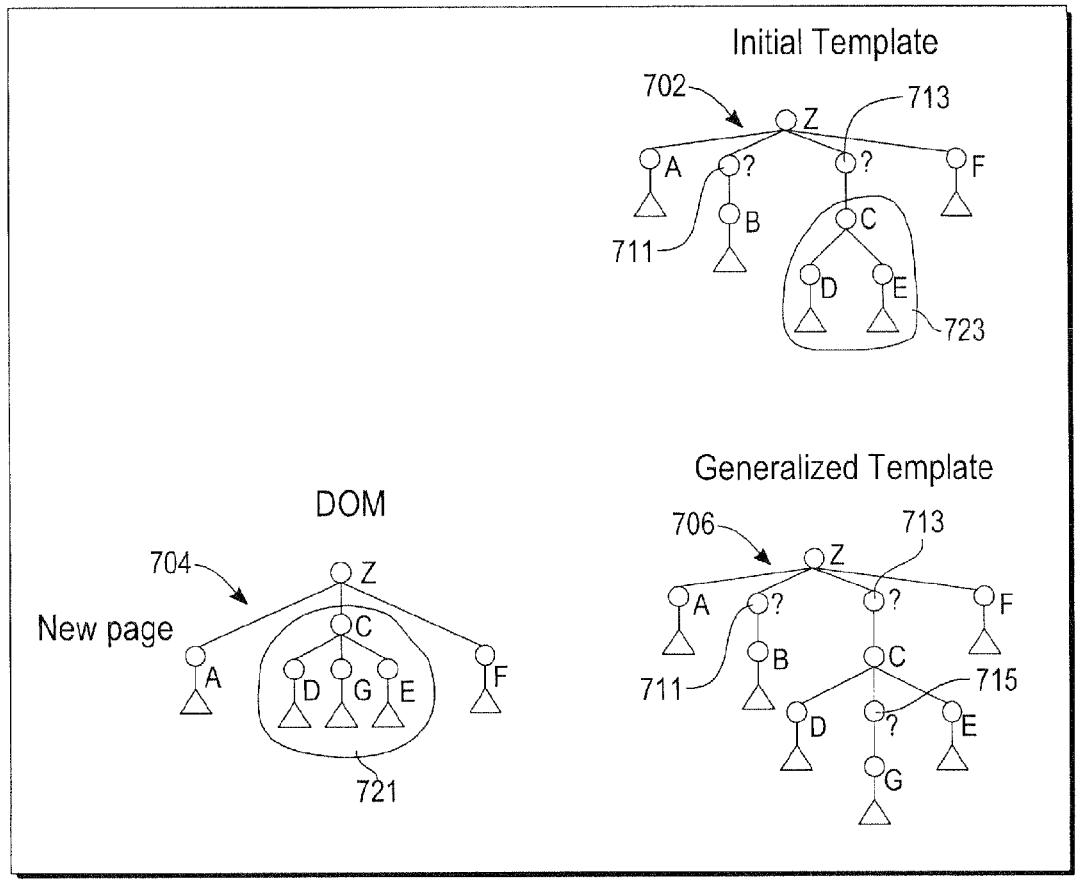
FIG. 7 illustrates an initial template prior to matching with a DOM and a generalized template formed as a result of HOOK node processing, in accordance with an embodiment.

If the template node is a HOOK, the DOM node is matched with children of the HOOK node. FIG. 7 illustrates an initial template 702 prior to matching with a DOM 704 and generalized template 706 as a result of the comparison, in accordance with an embodiment. In FIG. 7, nodes having an A, B, . . . , Z denote distinct HTML tags and triangles represent subtrees of the node above the subtree. In this example, a HOOK node has only a single child (although multiple grandchildren). A HOOK node is only allowed to have a single child, in one embodiment. However, in another embodiment, a HOOK node may have multiple children. If the subtree in the DOM matches the sub-tree under the HOOK node in the template, the matching continues with the next Template and DOM nodes. For example, HOOK node 711 "matches" with the DOM 704 because the DOM 704 is not required to have the B node below the HOOK node 711. Therefore, the matching continues with HOOK node 713.

If the sub-tree under a HOOK node matches only partially with the sub-tree under the corresponding DOM node, the extent of match is recorded. The extent of the match may be based on the number of nodes in the sub-tree that do match and the number that do not match. For example, for the sub-tree of HOOK node 713, nodes C, D, and E match with the DOM sub-tree 721. However, since node G from the DOM sub-tree 721 is not found in the sub-tree of HOOK node 713 it is a mismatch. The extent of the mismatch can be expressed as a ratio, percentage, etc. that reflects that fact that three nodes match and one node does not match. Different nodes can have different weights when computing the extent of match. For example, nodes can be weighted based on their level. In one embodiment, nodes at a higher logical level in the tree are assigned a greater weight.

When a sub-tree in the DOM 704 fails to match a sub-tree in the template 702, it is matched with sub-trees that are rooted at template nodes that are siblings of the template node that was the root of the mismatch. This continues on until the root template node is not a HOOK node. For example, in template 702, the template node that is a mis-match is HOOK node 713. The next node is the F node, as processing is from left to right in this embodiment. Because the F node is not a HOOK node, this is the last node that is compared to the mismatched sub-tree 721 in the DOM 704. If there were more HOOK nodes between HOOK node 713 and node F, the subtrees of each of the HOOK nodes would be matched with the mismatched sub-tree 721. If any of these hypothetical template subtrees are an exact match with the mismatched sub-tree 721, then the mismatched sub-tree 721 would be considered to have matched with the template 702. However, if none of these hypothetical template sub-trees match the mismatched sub-tree 721, then one of the template sub-trees is selected to be modified such that it will match the mismatched sub-tree 721. In one embodiment, the template sub-tree that comes closest to matching the mismatched sub-tree 721 is selected for modification.

Referring to FIG. 7, the C subtree 723 in the template 702 comes closest to matching the mismatched subtree 721 in the DOM 704. In this case, the C sub-tree 723 in the template 702 is modified to match the C sub-tree in the DOM. In particular, the HOOK node 715 and G node are added to the C-subtree 723 in the generalized template 706. However, it is also possible to add a new sub-tree in the template 702 instead of modifying an existing sub-tree. For example, because the mismatched subtree 721 occurs between the A and F nodes in the DOM 704, a new subtree might be added to the template somewhere between the A node and F node. This might be done if the template does not have an existing sub-tree that is a close enough match to the mismatched sub-tree 721 in the DOM 704. In one embodiment, a cost of modifying the template 702 is computed to determine how to modify the template. Determining how to modify the template can include determining a location, types of nodes, etc. A decision can also be made as to whether or not to modify the template, based on a cost.

OR Node Processing

Figure 8:
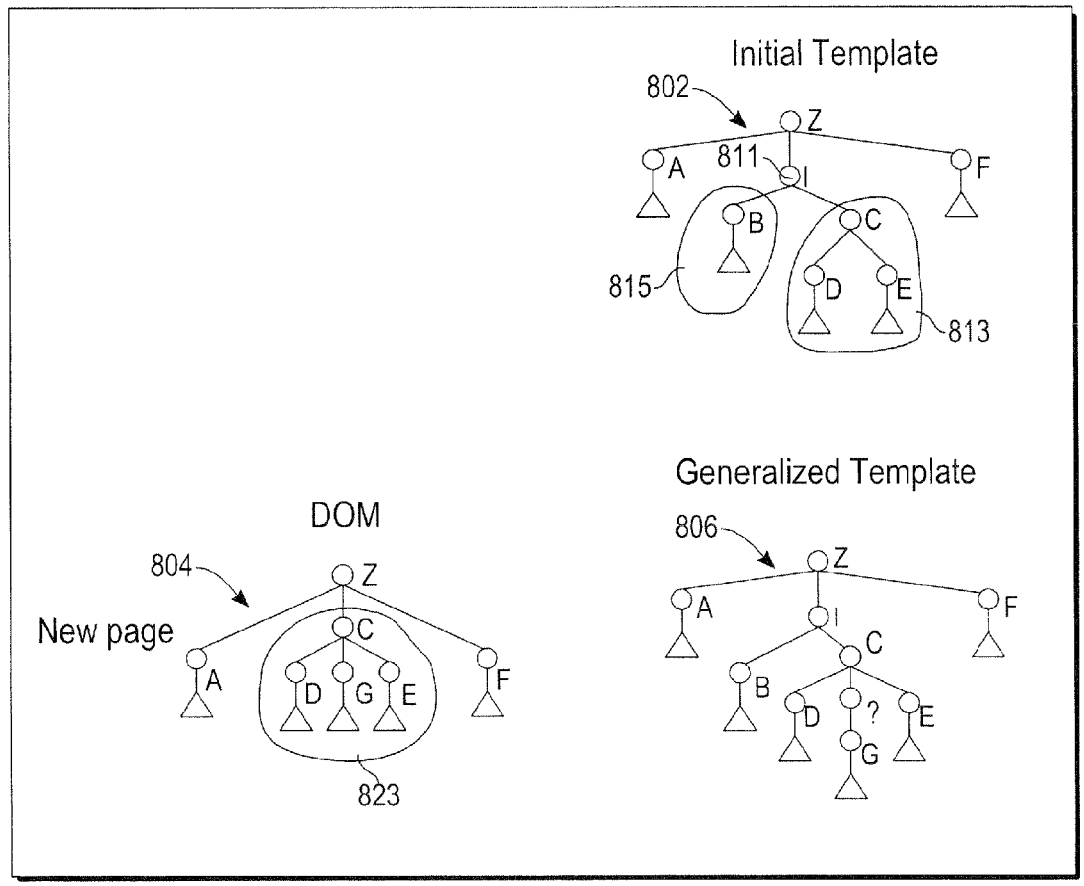
FIG. 8 illustrates an example template before it is compared to a DOM and the generalized template that results from generalizing the template as a result of OR node processing, in accordance with an embodiment of the present invention.

FIG. 8 illustrates an example initial template 802 that is compared to a DOM 804, and the generalized template 806 that results from generalizing the initial template 802 to match the DOM 804, in accordance with an embodiment of the present invention. The template has an OR node 811 and two OR sub-trees 813, 815. In this example, the template OR node 811 has multiple children. The C sub-tree 823 in the DOM 804 is matched with each sub-tree 813, 815 of the OR node 811 and an extent of match is recorded for each comparison. For example, the DOM C sub-tree 823 does not match well with the sub-tree 815, but comes close to matching the sub-tree 813. If the DOM C sub-tree 823 had an exact match in the template 802, then there would be no need for a modification. In this case, the closest match in the template 802 is the sub-tree 813, which is missing a G node relative to the DOM subtree 823. A decision is made to modify sub-tree 813 such that it matches the DOM C sub-tree 823. It is also possible to add a new sub-tree to the template 802 to match the DOM C sub-tree 823. Adding a sub-tree to the template is performed if the cost of modifying an existing sub-tree in the template is less than a specified threshold, in one embodiment.

When comparing a template node to DOM node, if the names (e.g., tag names) do not match, then a mismatch routine is called with an indication of the mismatched template node and DOM nodes. It is possible that a node exists in the template 802 that has no corresponding node in the DOM 804 or vice versa. For example, the G node in the DOM 804 has no corresponding node in the template 802. For this type of mismatch, a mismatch routine is called with an additional indication that one of the two nodes (in DOM and Template) is absent. Note when processing an OR sub-tree, there is no requirement that an OR operator be added. For example, in FIG. 8, a HOOK operator is added to the OR subtree 813 to resolve the mismatch between the template 802 and the DOM.

B) Generalizing the Template Based on Comparison with Training Set

When a mismatch routine is called due to a mismatch between the template and the DOM, a determination is made as to whether to resolve the mismatch by generalizing the template. If the template is generalized, the mismatch is ensured to be resolved by adding an appropriate STAR, HOOK, or OR operator, thereby generalizing the template, in an embodiment. In an embodiment, when the mismatch routine is called, a template node "w" and a DOM node "d" are provided to the mismatch routine to indicate where a mismatch occurred. A mismatch can occur in two cases: (i) when the structure of the template and DOM have corresponding nodes, but the nodes not match with each other, and (ii) when the structure is such that a node is absent in either the template or the DOM. If there are corresponding nodes that do not match, then "w" and "d" are the corresponding nodes. If the template structure does not have a node that is present in the DOM, then the mismatch routine is called with "d" as the position under which the missing template structure should be added, with a flag set to indicate this special case. If the DOM structure does not have a node that is present in the template, then the mismatch routine is called with "w" as the position under which the missing DOM structure should be added, with a flag set to indicate this special case.

When a DOM node is to be added into the template, the DOM subtree is first normalized into a regular expression by finding repeated patterns in that subtree, in an embodiment.

This is similar to how the regex is learned for the initial template, in an embodiment. Thus, in an embodiment, "adding a DOM node to the template" is accomplished by "adding a regex tree corresponding to the DOM node to the template".

Figure 9:
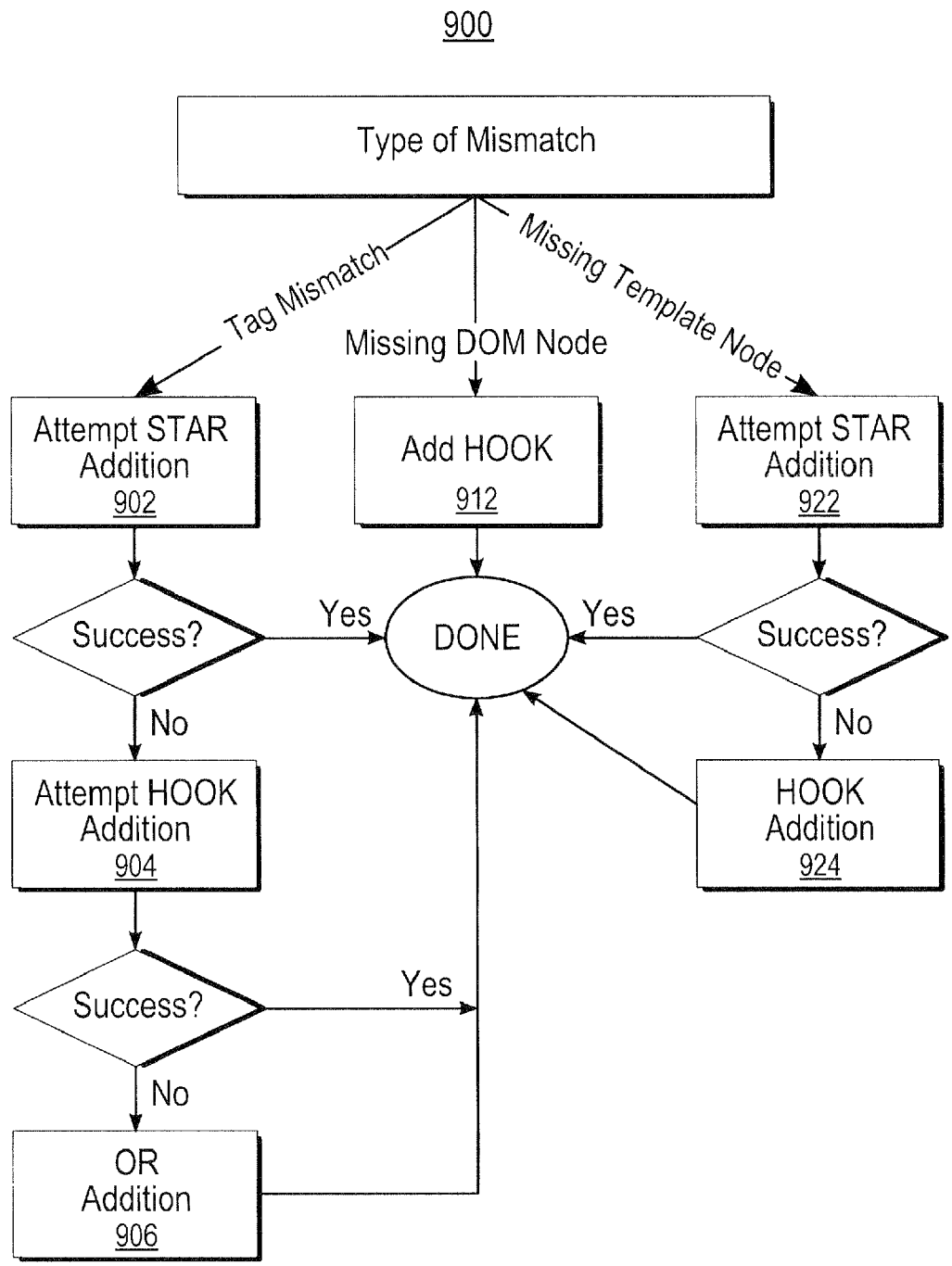
FIG. 9 is an overview of a process of generalizing a template, in accordance with an embodiment of the present invention.

FIG. 9 is an overview of a process 900 of generalizing a template, in accordance with an embodiment of the present invention. The actions taken depend on the type of mismatch. If there is a tag mismatch, an attempt is made to add a STAR node to the template, in step 902. If STAR addition fails, an attempt is made to add a HOOK node to the template, in step 904. If the attempt to add a HOOK node in step 904 fails, then an OR node is added to the template, in step 906. The details of each of the three operations are explained below.

If a mismatch occurs because there is no DOM node to match a template node, the template node that is missing in the DOM is made optional, in step 912. For example, a HOOK node is added as the parent of the template node that is missing in the DOM.

If a mismatch occurs because there is no template node to match a DOM node, an attempt is made to add a STAR node, in step 922. If STAR node addition fails, then the DOM node that is missing in the template is added to the template as an optional (HOOK) node, in step 924.

The order in which the addition of operators to the template is attempted is in accordance with an embodiment of the present invention. Attempting to add operators in this order may help to generalize the existing structure before adding new changes. However, it is not required to attempt to add operators in the order depicted in FIG. 9. In one embodiment, the choice of which operator to add to the template may also be determined based on the extent of change (e.g., cost) that adding operators would induce on the template structure.

i) Star Addition

Figure 10:
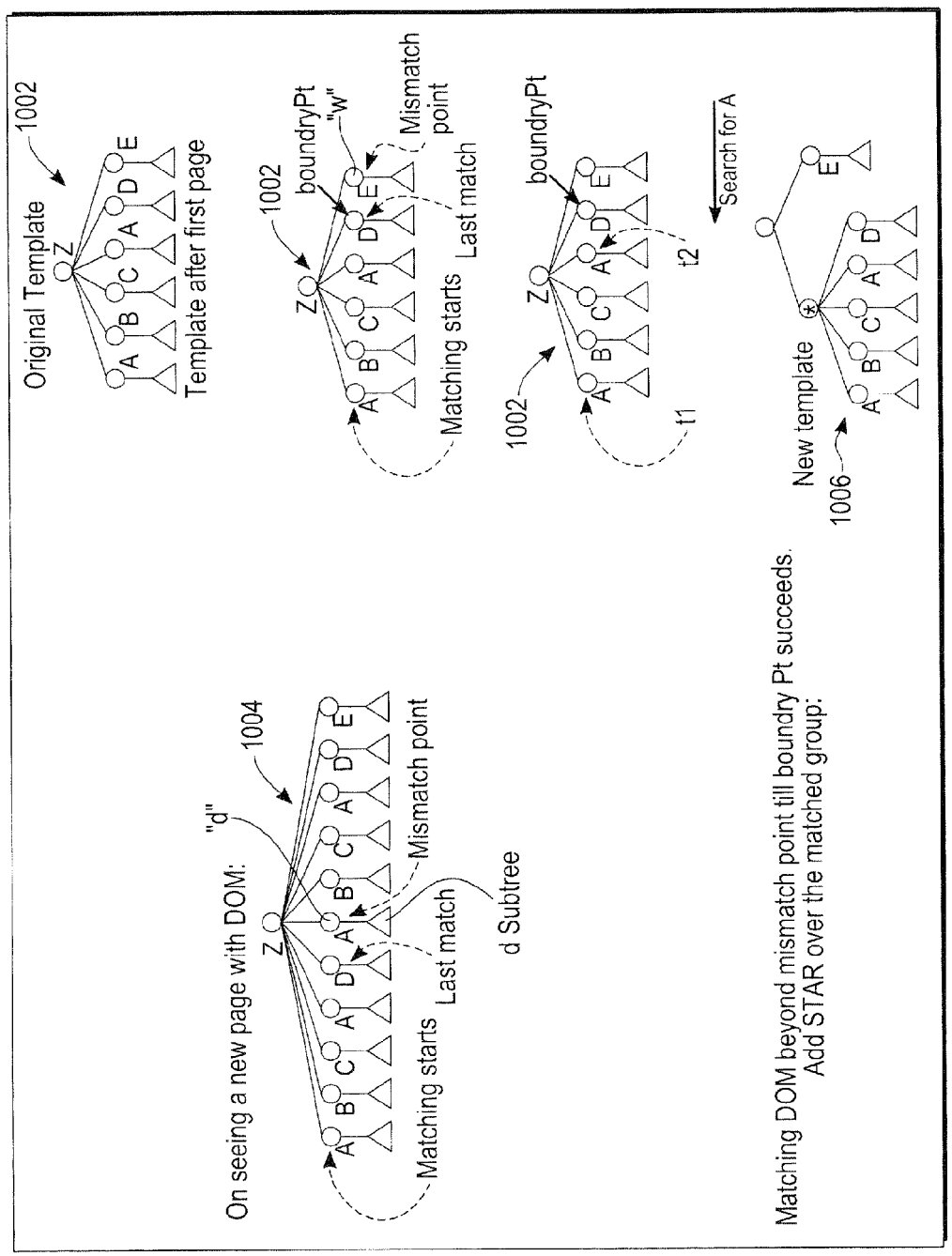
FIG. 10 depicts an example of STAR addition to a template, in accordance with an embodiment.

STAR addition is used to generalize the template by allowing, but not requiring, repetition of a group of subtrees, in an embodiment. This generalizing of the repetition includes identifying the largest group of subtrees that repeats, in an embodiment. FIG. 10 depicts an example of STAR addition to a template, in accordance with an embodiment. As previously discussed, STAR addition may be called when a DOM node does not match with a corresponding template node. For example, in FIG. 10, the children of node Z in the original template 1002 are A, B, C, A, D, E. The children of node Z in the DOM 1004 are A, B, C, A, D, A, etc. Note that there is a mismatch at the sixth child node from the left. In the following discussion, the mismatched node in the DOM will be referred to as "d", and the mismatched node in the template will be referred to as "w". The sibling in the template 1002 to the left of "w" is remembered as a boundary point (node D in the template 1002 of FIG. 10 is labeled as a boundaryPt).

STAR addition may also be called when there is no template node to match a DOM node. For example, consider the template 1002 of FIG. 10 without the E node. In this case, the rightmost child of the passed parent node "w" acts as the boundary point. In this case, the mismatch routine would be called on the node Z in the template 1002 (the "passed parent node w") and the mismatch point A in the DOM 1004. In this case, the boundary point will be the rightmost child of Z (the passed parent node), which is node D (since E does not exist in the template 1102 in this example).

The portion of the template 1002 to the left of the boundary point is searched for an exact match to the subtree on d. In this example, the d subtree is represented by the triangle below d; therefore, the search "A" represents a search in the template 1002 for the d-sub-tree. The search continues to the left to the leftmost sibling of the boundary point. If no match is found, then the STAR addition routine returns as failed, and the mismatch routine attempts to solve the mismatch using a HOOK/OR node addition. In FIG. 10, there are two matches for the d sub-tree, which are designated as t1 and t2. More generally, the set of matches is designated as $\{t_1, t_2, \ldots, t_n\}$.

All matches in the searched portion of the template 1002 are processed from the leftmost match first. The sequence of siblings from $t_i$ to the boundary point are designated as $\{t_i, s_{i1}, s_{i2}, \ldots, s_{ik}, boundaryPt\}$. The sibling subtrees $\{s_{i1}, s_{i2}, \ldots, s_{ik}, boundaryPt\}$ are matched with sibling subtrees in DOM in sequence. For example, from $t_1$ to boundaryPt in the template 1002, the sibling subtree sequence is A, B, C, A, D, which matches with corresponding sibling subtrees in the DOM 1004.

If the matching succeeds from ti to the boundary point (boundaryPt), then a STAR is added over the template nodes from ti to the boundary point ($\{t_i, s_{i1}, s_{i2}, \ldots, s_{ik}, boundaryPt\}$), and the STAR addition routine returns successfully. For example, in the example in FIG. 10, matching succeeds from $t_1$ to boundaryPt; therefore, a STAR node is added to the new template 1006 as depicted in FIG. 10.

If, however, the matching fails before the boundary point is reached, then next subtree $t_{i+1}$ is considered versus the same starting point in the DOM. For example, the sibling subtrees starting at $t_2$ to the boundary point would be compared with sibling subtrees in the DOM 1004 starting at the mismatch point to determine whether there is a match. For example, the sibling subtrees in the template 1002 between $t_2$ to boundaryPt is the sequence A, D. The sequence A, D would be compared to the DOM starting at the mismatch point. The DOM sequence starting at the mismatch point is [A, B, C, A, D, E].

If no match is found for any sibling subtrees starting at any of the points $\{t_1, t_2, \ldots, t_n\}$, then matching is enforced for the sibling subtree sequence starting from the last subtree $t_n$ by calling a mismatch handling routine recursively. The matching continues to further siblings $s_{nj}$ (calling mismatch wherever applicable). Finally, when the boundary point is reached, a STAR is added over the template nodes from $t_n$ to the boundary point ($\{t_n, s_{n1}, s_{n2}, \ldots, s_{nk}, boundaryPt\}$). The STAR addition routine returns as having succeeded.

It may be that a mismatch is "called within itself". In order to resolve one mismatch (e.g., $MM_{ext}$), there might be another internal mismatch, $MM_{int}$ that needs to be resolved first. In such a scenario, because $MM_{ext}$ is already partially resolved by processing the internal mismatch $MM_{int}$, when handling $MM_{ext}$ is not necessary to go all the way to the leftmost sibling, but only until a closer left boundary point is reached.

ii) Hook Addition

In one embodiment, if STAR node addition fails, an attempt is made to add a HOOK operator over a mismatched node. The mismatched node may be a node from the DOM or the initial template. In one embodiment, a one-step look-ahead is used. In another embodiment, a multi-step look-ahead is performed. One-step look ahead refers to stepping through the template or DOM only one-step (e.g., one node) for an exact match. For example, if the template is (A,B,C,D) and the DOM is (A,B,C,E,D), then, in one-step look-ahead, the E can be made optional by adding a HOOK over the E. That is, looking ahead one step is sufficient to determine that the D node in the template has a match in the DOM. Adding the HOOK to the template results in a complete match and also results in a relatively small cost of generalizing the template. However, if the DOM is (A,B,C,E,F,D), then one-step look-ahead may not resolve this mismatch as efficiently as multi-step look ahead. Multi-step look ahead refers to looking ahead more than one step (or node). In the present example, looking ahead at least two nodes would result in a determination that the D node in the template has a match in the DOM. However, looking ahead only a single node would not locate the D node in the DOM. Thus, the generalization to the template using one-step look ahead might incur a greater cost. The cost of generalizing the template is discussed in more detail below. In one embodiment, an attempt is made to add a HOOK operator using one-step look ahead rather than performing multi-step look-ahead.

Figure 11A:
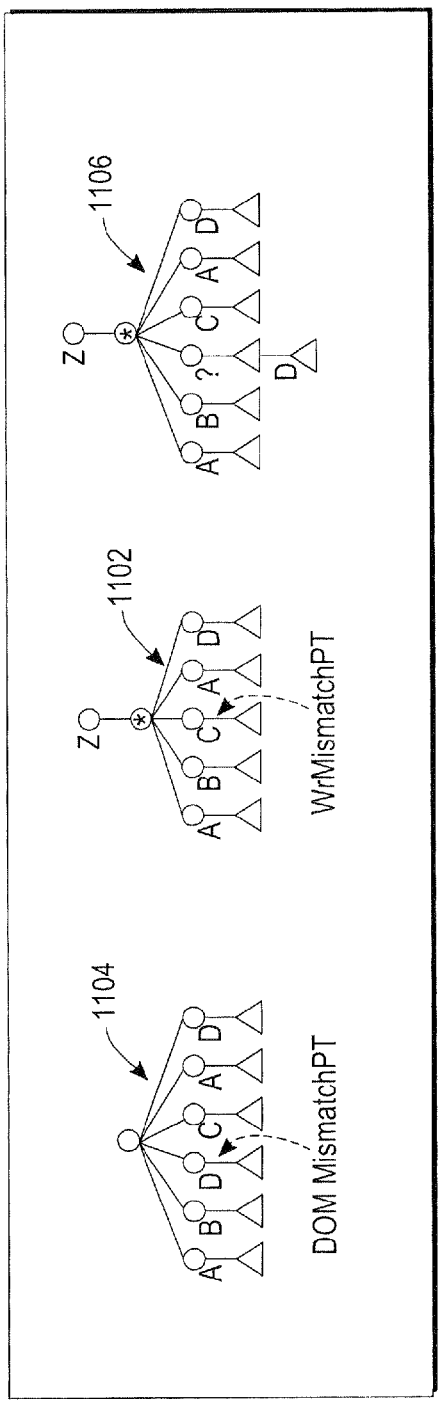
FIG. 11A illustrates an example initial template, example DOM and a generalized template that is the result of adding a HOOK operator, in accordance with an embodiment.

FIG. 11A illustrates an example initial template 1102, example DOM 1104, and a generalized template 1106 that is the result of adding a HOOK operator, in accordance with an embodiment. In FIG. 11A, the mismatched template node is labeled "wrMismatchPt", and the corresponding mismatched DOM node is labeled "domMismatchPt."

The following example is presented to illustrate modifying the template 1102 by adding a HOOK node. First, a determination is made as to whether wrMismatchPt matches completely with the next sibling of domMismatchPt. Referring to FIG. 11A, the next sibling of domMismatchPt is the C node to the right of domMismatchPt. If there is a match, then domMismatchPt is added into the template as an optional node (under HOOK) before wrMismatchPt. In this example, wrMismatchPt matches completely with the next sibling of domMismatchPt; therefore, the HOOK node and D node are added to the template as depicted in template 1106.

Figure 11B:
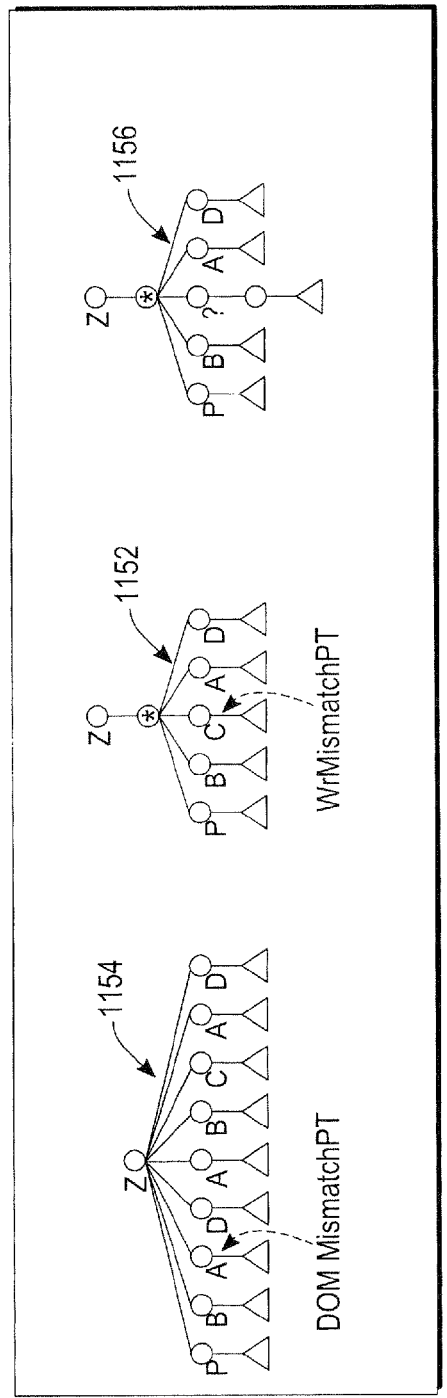
FIG. 11B illustrates an example initial template, example DOM and a generalized template that is the result of adding a HOOK operator, in accordance with an embodiment.

FIG. 11B illustrates a generalization to a template in the event wrMismatchPt does not match completely with the next sibling of domMismatchPt. In this event, a determination is made as to whether domMismatchPt matches completely with the next sibling of wrMismatchPt. If so, the wrMismatchPt is changed to an optional node. In FIG. 11B, the next sibling of wrMismatchPt in template 1152 is an A node, which matches with the domMismatchPt in DOM 1154. Therefore, the C node in initial template 1152 is changed to an optional node in the new template 1156 by the addition of a HOOK node above the C node. Further, HOOK addition is considered successful.

In some cases, the generalization in both FIG. 11A and FIG. 11B may be possible. In such a case, either option may be performed. If a HOOK node is not added by either options, then the HOOK addition routine returns as failed. In this event, an attempt is made to generalize the template by adding an OR operator.

iii) OR Addition

OR addition is called when both STAR and HOOK additions fail, in an embodiment. In one embodiment, OR addition is used as a last resort to enforce matching. The use of OR addition assures that the template will be matched to all of the DOMs in the training set, in an embodiment.

Figure 12:
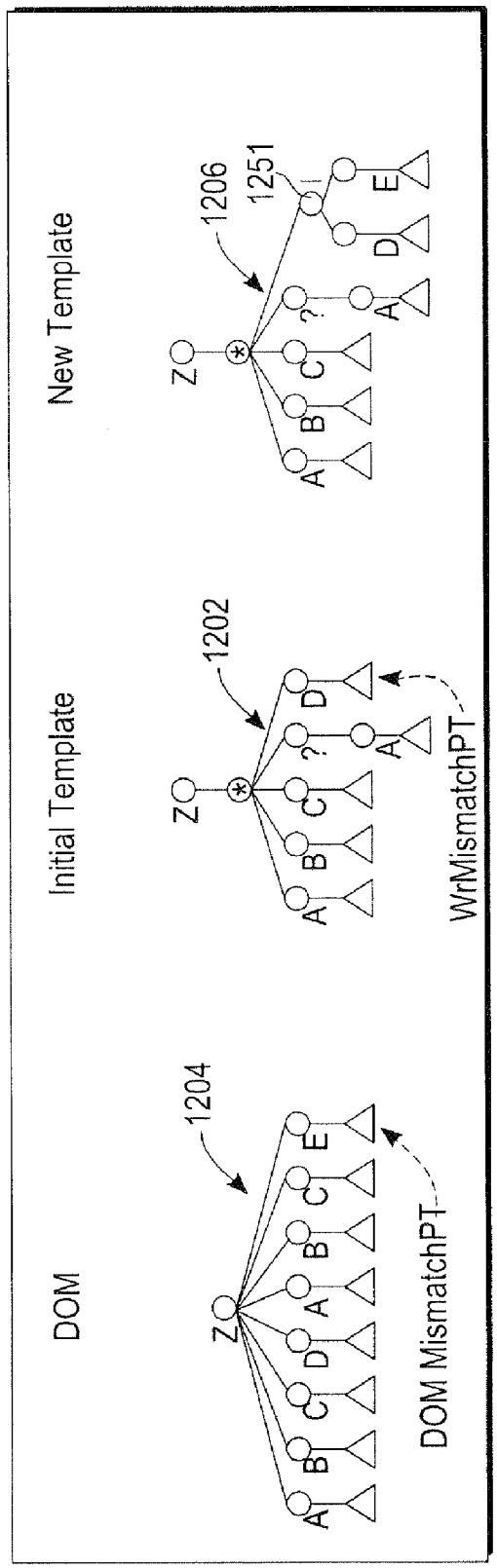
FIG. 12 depicts an example of adding an OR node to generalize a template, in accordance with an embodiment.

FIG. 12 depicts an example of adding an OR node to generalize a template, in accordance with an embodiment. In the initial template 1202, the children of the Z node are A, B, C, optionally A, and D. Thus, the mismatched nodes are "DomMismatchPt" and "WrMismatchPt". In the example, a new OR node 1251 is created in the new template 1206, and the mismatched Template node (D) and DOM node (E) are added as children of this OR node 1251.

If the mismatched template node (WrMismatchPt) is already under an OR node in the initial template 1204, or if WrMismatchPt is itself an OR node, then a new OR node is not added to the new template 1206. Rather, the mismatched DOM node (DomMismatchPt) is added as a child of the existing OR node.

iv) Addition of Operators Across Tree Levels

The operations defined in the above examples to resolve a mismatch work at the same logical level in the template as that of the mismatch point. By the "same logical level" it is meant that the mismatch is handled by adding operators at the same logical level in the template. As previously mentioned, for purposes of counting logical levels, operators (e.g., HOOK, OR, STAR) are not counted as a logical level. For purposes of discussion, logical levels will be counted upward when moving towards a leaf node.

Figure 13:
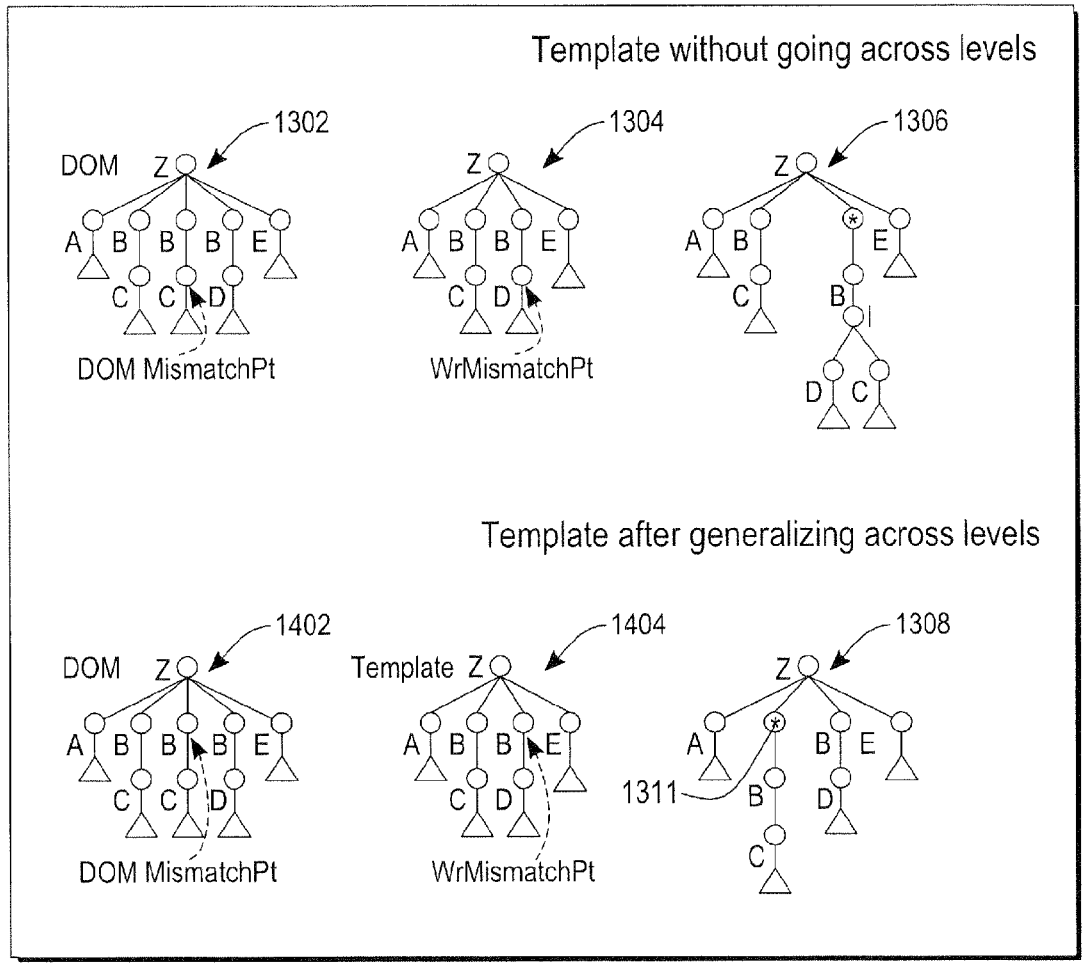
FIG. 13 depicts generalizing a template across levels, in accordance with one embodiment.

FIG. 13 shows an example DOM 1302 and an initial template 1304, in which there are two different mismatch points. Template 1306 shows how the initial template 1104 could be generalized without going across levels. Note that a STAR operator is added at the same logical level as the mismatch caused by the additional B node in the second logical level DOM 1302. Further, the OR operator is added at the same logical level as the mismatch caused by the additional C node in the third logical level of the DOM 1302. Template 1308 depicts generalizing the template across logical levels, in accordance with an embodiment.

In one embodiment, a set of operations referred to herein as "Cross Level STAR Addition" (CLSA) and "Cross Level HOOK Addition" (CLHA) are added to the template. The CLSA and CLHA are added by examining the initial template and the DOM at a level other than the level at which the mismatch occurred. In one embodiment, higher levels are examined to attempt to resolve the mismatch between the template and the DOM at a higher level.

Cross Level STAR Addition (CLSA)

When a mismatch occurs, after attempting to add a STAR operator at the same logical level as the mismatch, a determination is made as to whether a STAR operator can be added at a higher level. Referring to FIG. 13 with respect to the mismatch at the third logical level, an attempt to add a STAR operator at the third level will fail. Thus, an attempt is made to add a STAR operator at a higher level. In this example, the parents of the mismatched nodes are examined to determine whether STAR addition is possible at the second logical level. In this example, a STAR operator 1311 can be added at the second logical level. Note that the template 1308 has been generalized to match the DOM 1302 (i.e., both mismatches have been handled) with the addition of a single STAR operator 1311 at a higher level than at least one of the mismatches. An attempt can also be made to add the STAR operator more than one level away from the mismatch.

Cross Level HOOK Addition (CLHA)

Figure 14:
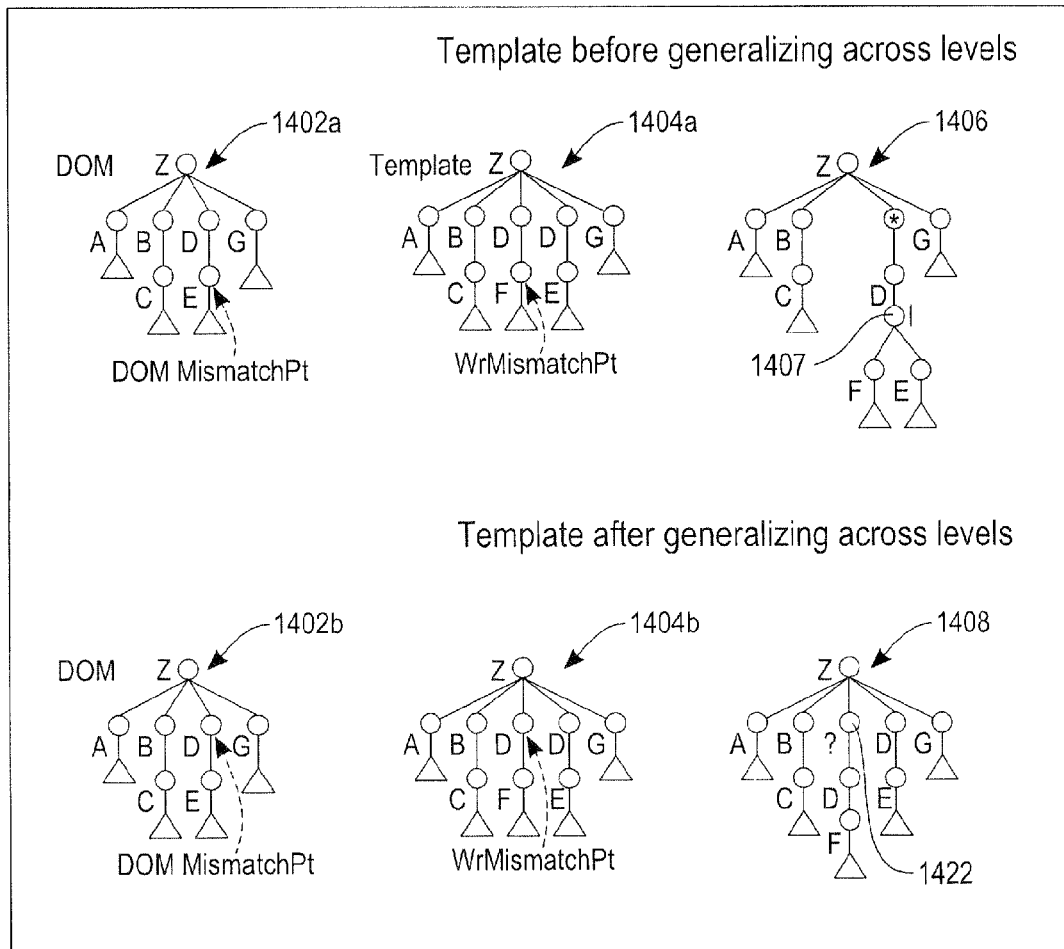
FIG. 14 depicts generalizing a template across levels, in accordance with another embodiment.

In one embodiment, if attempting to add a HOOK operator at the same logical level as the mismatch fails, then before attempting to add an OR operator at the logical level of the mismatch, an attempt is made to add a HOOK operator at a higher level than the mismatch. FIG. 14 depicts an example to illustrate this embodiment. In the example, there are mismatches between the DOM 1402a and the initial template 1404a at the third logical level. Template 1406 depicts a template that is generalized to match the DOM 1402a without performing CLHA. Note that an OR operator 1407 has been added to the third logical level of template 1406.

Template 1408 depicts a template that is generalized to match the DOM 1402b by performing CLHA. Note that a single HOOK operator 1422 has been added at the second logical level in order to modify the template to match the DOM 1402b. In this example, instead of adding an OR operator to resolve the mismatch at the third logical level, the mismatch points are first set to their respective parents to check if CLHA is applicable. Referring to DOM 1402b, the DOM mismatch point at the third logical level is moved to the parent at the second logical level. Referring to template 1404b, the template mismatch point at the third logical level is moved to the parent at the second logical level. In this example, CLHA succeeds. The mismatch points can be moved up by more than one level.

If neither CLSA nor CLHA succeeds, the mismatch can be resolved by adding an operator at the same level as the mismatch.

iv) Cost of Generalizing the Template

When the template is modified (or proposed to be modified), the template is said to incur a cost of generalization. This cost is the cost of modifying the template to match the current document completely, in an embodiment. A low cost implies that the current document is similar to the other documents in the training set used to build the template. On the other hand, a high cost implies relatively large differences and possibly that the current document is heterogeneous with respect to the rest of the training documents. In an embodiment, a threshold is specified for the cost wherein the template is not modified to match the current document if the cost would be too high. Thus, documents that are too dissimilar from the rest of the training documents are, in effect, removed from the training set.

The following are example factors that can be used to compute the cost. It is not required that all of the factors be used. Each factor can be weighed differently.

1) The size of the changed subtree (number of nodes in the subtree), S. The larger the size of the subtree added/modified, the higher is the cost of change.

2) The height (depth) of the subtree added/modified, H. In principle, on a modified subtree, the nodes added at the top of the subtree have more importance and hence incur higher cost than those at the bottom. It means that a cost of addition of a subtree of size S will be larger if it is a shallow tree (the subtree has lower H).

3) The level in the template which this change occurred, L, computed from the top of the template. The cost decreases exponentially with increasing L. This means that the changes towards the top of the tree incur more cost than those towards the bottom of the tree.

4) The operator added. In one embodiment, the STAR operator does not add any cost, since it generalizes the repetition count. In one embodiment, the OR operator induces cost based on whether it is added as a new node to the template or another disjunction is added to an existing OR node. In one embodiment, the HOOK operator cost depends on whether an existing structure in the template is made optional or a new optional subtree is added to the template.

A particular example of the cost function is $Cost = S \times 10^{1-[(L+H/2)/D]}$, where D is the overall depth (height) of the template and used to normalize the numerator L+H/2. There can be many other such functions.

The cost of change is compared against the sizes of the original template and the current DOM. The size of the current template is computed similar to the one used to compute the cost of change—i.e., every node is weighed proportional to its height H in the template. The current page is said to make a significant change to the template if cost of change induced by the current page is more than a pre-determined fraction (say 30%) of the template and DOM sizes. The template and DOM size can be calculated in many other ways— by simply counting the number of nodes in the template/DOM to weighing them differently by their depth in the tree, relative importance, etc.

HARDWARE OVERVIEW

Figure 16:
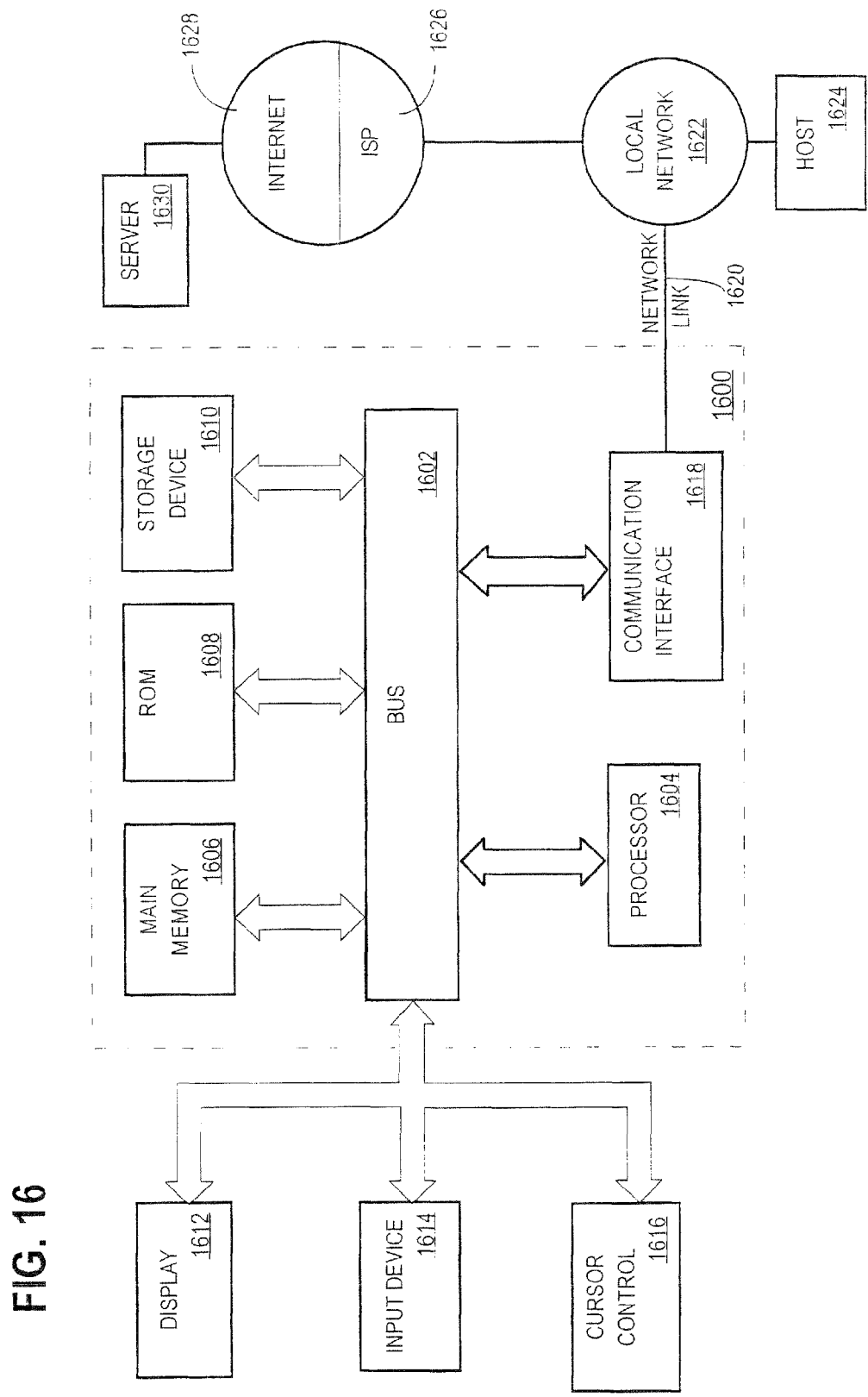
FIG. 16 is a block diagram that illustrates a computer system upon which an embodiment of the invention may be implemented.

FIG. 16 is a block diagram that illustrates a computer system 1600 upon which an embodiment of the invention may be implemented. Computer system 1600 includes a bus 1602 or other communication mechanism for communicating information, and a processor 1604 coupled with bus 1602 for processing information. Computer system 1600 also includes a main memory 1606, such as a random access memory (RAM) or other dynamic storage device, coupled to bus 1602 for storing information and instructions to be executed by processor 1604. Main memory 1606 also may be used for storing temporary variables or other intermediate information during execution of instructions to be executed by processor 1604. Computer system 1600 further includes a read only memory (ROM) 1608 or other static storage device coupled to bus 1602 for storing static information and instructions for processor 1604. A storage device 1610, such as a magnetic disk or optical disk, is provided and coupled to bus 1602 for storing information and instructions.

Computer system 1600 may be coupled via bus 1602 to a display 1612, such as a cathode ray tube (CRT), for displaying information to a computer user. An input device 1614, including alphanumeric and other keys, is coupled to bus 1602 for communicating information and command selections to processor 1604. Another type of user input device is cursor control 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane.

The invention is related to the use of computer system 1600 for implementing the techniques described herein. According to one embodiment of the invention, those techniques are performed by computer system 1600 in response to processor 1604 executing one or more sequences of one or more instructions contained in main memory 1606. Such instructions may be read into main memory 1606 from another machine-readable medium, such as storage device 1610. Execution of the sequences of instructions contained in main memory 1606 causes processor 1604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1600, various machine-readable media are involved, for example, in providing instructions to processor 1604 for execution. Such a medium may take many forms, including but not limited to storage media and transmission media. Storage media includes both non-volatile media and volatile media. Non-volatile media includes, for example, optical or magnetic disks, such as storage device 1610. Volatile media includes dynamic memory, such as main memory 1606. Transmission media includes coaxial cables, copper wire and fiber optics, including the wires that comprise bus 1602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1604 for execution. For example, the instructions may initially be carried on a magnetic disk of a remote computer. The remote computer can load the instructions into its dynamic memory and send the instructions over a telephone line using a modem. A modem local to computer system 1600 can receive the data on the telephone line and use an infra-red transmitter to convert the data to an infra-red signal. An infra-red detector can receive the data carried in the infra-red signal and appropriate circuitry can place the data on bus 1602. Bus 1602 carries the data to main memory 1606, from which processor 1604 retrieves and executes the instructions. The instructions received by main memory 1606 may optionally be stored on storage device 1610 either before or after execution by processor 1604.

Computer system 1600 also includes a communication interface 1618 coupled to bus 1602. Communication interface 1618 provides a two-way data communication coupling to a network link 1620 that is connected to a local network 1622. For example, communication interface 1618 may be an integrated services digital network (ISDN) card or a modem to provide a data communication connection to a corresponding type of telephone line. As another example, communication interface 1618 may be a local area network (LAN) card to provide a data communication connection to a compatible LAN. Wireless links may also be implemented. In any such implementation, communication interface 1618 sends and receives electrical, electromagnetic or optical signals that carry digital data streams representing various types of information.

Network link 1620 typically provides data communication through one or more networks to other data devices. For example, network link 1620 may provide a connection through local network 1622 to a host computer 1624 or to data equipment operated by an Internet Service Provider (ISP) 1626. ISP 1626 in turn provides data communication services through the world wide packet data communication network now commonly referred to as the "Internet" 1628. Local network 1622 and Internet 1628 both use electrical, electromagnetic or optical signals that carry digital data streams. The signals through the various networks and the signals on network link 1620 and through communication interface 1618, which carry the digital data to and from computer system 1600, are exemplary forms of carrier waves transporting the information.

Computer system 1600 can send messages and receive data, including program code, through the network(s), network link 1620 and communication interface 1618. In the Internet example, a server 1630 might transmit a requested code for an application program through Internet 1628, ISP 1626, local network 1622 and communication interface 1618.

The received code may be executed by processor 1604 as it is received, and/or stored in storage device 1610, or other non-volatile storage for later execution. In this manner, computer system 1600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method comprising:
   comparing, one document at a time, a structure of documents in a training set with a structure of an initial template;
   selecting at least one of the documents based on the comparing;
   generalizing the initial template to create a generalized template that has a structure that matches each of the selected documents;
   wherein generalizing the initial template to create the generalized template includes adding one or more operators to the initial template from a set of operators to create the generalized template, wherein the one or more operators includes a first operator that indicates that only one of a plurality of subtrees below the operator is allowed to occur at a position in the selected documents that corresponds to the position of the first operator in the generalized template.

2. The method of claim 1, wherein the generalized template includes:
   a second operator having a first subtree associated therewith, wherein the second operator indicates that the first subtree must occur at least once at a position in the selected documents that corresponds to the position of the second operator in the generalized template; and
   a third operator having a second subtree associated therewith, wherein the third operator indicates that the second subtree is optional at a position in the selected documents that corresponds to the position of the third operator.

3. The method of claim 2, wherein the document includes a first set of tags and relationships between tags in the first set of tags, and the initial template includes a second set of tags and relationships between tags in the second set of tags, and further comprising:
   determining that the mismatch occurs, wherein determining that the mismatch occurs includes:
      based on the relationships between tags in the first set of tags and the relationships between tags in the second set of tags, determining that a tag in the first set fails to match a tag in the second set;
   wherein generalizing the initial template includes attempting to modify the initial template by adding the first operator prior to attempting to modify the initial template by adding the second operator and prior to attempting to modify the initial template by adding the third operator.

4. The method of claim 2, wherein the document includes a first set of tags and relationships between tags in the first set of tags, and the initial template includes a second set of tags and relationships between tags in the second set of tags, and further comprising:

determining that the mismatch occurs, wherein determining that the mismatch occurs includes:

based on the relationships between tags in the first set of tags and the relationships between tags in the second set of tags, determining that a tag in the first set fails to match a tag in the second set;

wherein generalizing the initial template includes attempting to modify the initial template by adding the second operator after an attempt to modify the initial template by adding the first operator fails and prior to attempting to modify the initial template by adding the third operator.

5. The method of claim 2, wherein the document includes a first set of tags and relationships between tags in the first set of tags, and the initial template includes a second set of tags and relationships between tags in the second set of tags, and further comprising:

determining that the mismatch occurs, wherein determining that the mismatch occurs includes:

based on the relationships between tags in the first set of tags and the relationships between tags in the second set of tags, determining that a tag in the first set fails to match a tag in the second set;

wherein generalizing the initial template includes attempting to modify the initial template by adding the third operator after an attempt to modify the initial template by adding the first operator fails and after an attempt to modify the initial template by adding the second operator fails.

6. The method of claim 1, wherein the initial template includes a structure defined by a plurality of logical levels, and further comprising:

after determining that a mismatch occurs at a first level of the plurality of logical levels, determining whether to modify the initial template at a second level of the plurality of levels in order to create the generalized template, wherein the first level is a different level from the second level.

7. The method of claim 1 further comprising:

comparing an extent to which the portion of the document matches with each of a plurality of sub-trees in the initial template; and based on the extent to which the portion matches with each of the sub-trees, determining which sub-tree to modify to match the portion of the document.

8. A method of generalizing a template having a plurality of sub-trees, said method comprising:

comparing a structure of a first sub-tree of the plurality of sub-trees with a structure of a second sub-tree of the plurality of sub-trees, wherein the first sub-tree and the second sub-tree are not structurally identical;

determining a degree of structural similarity between the first sub-tree and the second sub-tree; and in response to determining that the degree of structural similarity is more than a specified threshold, generalizing the structure of the first sub-tree to generate a modified first sub-tree in the template, wherein the structure of the modified first sub-tree matches the structure of first sub-tree and the structure of the second sub-tree.

9. The method of claim 8, further comprising determining a co-efficient of similarity between sub-trees in the plurality of sub-trees.

10. A system comprising:

template storage; and template induction logic that is operable to:

compare, one document at a time, a structure of documents in a training set with a structure of an initial template;

select at least one of the documents based on the comparing;

generalize the initial template to create a generalized template that has a structure that matches each of the selected documents;

wherein to generalize the initial template to create the generalized template the logic is operable to add one or more operators to the initial template from a set of operators to create the generalized template, wherein the one or more operators includes a first operator that indicates that only one of a plurality of subtrees below the operator is allowed to occur at a position in the selected documents that corresponds to the position of the first operator in the generalized template; and store the generalized template in the template storage.

11. The system of claim 10, further comprising an information extraction engine that is operable to extract information from documents based on the generalized template stored in the template storage.

12. The system of claim 11, wherein the documents from which information is extracted are structurally similar to the training documents.

13. A non-transitory computer-readable storage medium storing one or more sequences of instructions which, when executed by one or more processors, cause the one or more processors to perform:

comparing, one document at a time, a structure of documents in a training set with a structure of an initial template;

selecting at least one of the documents based on the comparing;

generalizing the initial template to create a generalized template that has a structure that matches each of the selected documents;

wherein generalizing the initial template to create the generalized template includes adding one or more operators to the initial template from a set of operators to create the generalized template, wherein the one or more operators includes a first operator that indicates that only one of a plurality of subtrees below the operator is allowed to occur at a position in the selected documents that corresponds to the position of the first operator in the generalized template.

14. The non-transitory computer-readable storage medium of claim 13, wherein the generalized template includes:

a second operator having a first subtree associated therewith, wherein the second operator indicates that the first subtree must occur at least once at a position in the selected documents that corresponds to the position of the second operator in the generalized template; and a third operator having a second subtree associated therewith, wherein the third operator indicates that the second subtree is optional at a position in the selected documents that corresponds to the position of the third operator.

15. The non-transitory computer-readable storage medium of claim 14, wherein the document includes a first set of tags and relationships between tags in the first set of tags, and the initial template includes a second set of tags and relationships between tags in the second set of tags, and further comprising instructions for carrying out the steps of:

determining that the mismatch occurs, wherein determining that the mismatch occurs includes:
based on the relationships between tags in the first set of tags and the relationships between tags in the second set of tags, determining that a tag in the first set fails to match a tag in the second set;
wherein generalizing the initial template includes attempting to modify the initial template by adding the first operator prior to attempting to modify the initial template by adding the second operator and prior to attempting to modify the initial template by adding the third operator.

16. The non-transitory computer-readable storage medium of claim 14, wherein the document includes a first set of tags and relationships between tags in the first set of tags, and the initial template includes a second set of tags and relationships between tags in the second set of tags, and further comprising instructions for carrying out the steps of:
determining that the mismatch occurs, wherein determining that the mismatch occurs includes:
based on the relationships between tags in the first set of tags and the relationships between tags in the second set of tags, determining that a tag in the first set fails to match a tag in the second set;
wherein generalizing the initial template includes attempting to modify the initial template by adding the second operator after an attempt to modify the initial template by adding the first operator fails and prior to attempting to modify the initial template by adding the third operator.

17. The non-transitory computer-readable storage medium of claim 14, wherein the document includes a first set of tags and relationships between tags in the first set of tags, and the initial template includes a second set of tags and relationships between tags in the second set of tags, and further comprising instructions for carrying out the steps of:
determining that the mismatch occurs, wherein determining that the mismatch occurs includes:
based on the relationships between tags in the first set of tags and the relationships between tags in the second set of tags, determining that a tag in the first set fails to match a tag in the second set;
wherein generalizing the initial template includes attempting to modify the initial template by adding the third operator after an attempt to modify the initial template by adding the first operator fails and after an attempt to modify the initial template by adding the second operator fails.

18. The non-transitory computer-readable storage medium of claim 13, wherein the initial template includes a structure defined by a plurality of logical levels, and further comprising instructions for carrying out the steps of:
after determining that a mismatch occurs at a first level of the plurality of logical levels, determining whether to modify the initial template at a second level of the plurality of levels in order to create the generalized template, wherein the first level is a different level from the second level.

19. The non-transitory computer-readable storage medium of claim 13 further comprising instructions for carrying out the steps of:
comparing an extent to which the portion of the document matches with each of a plurality of sub-trees in the initial template; and
based on the extent to which the portion matches with each of the sub-trees, determining which sub-tree to modify to match the portion of the document.

20. A non-transitory computer-readable storage medium storing one or more sequences of instructions which, when executed by one or more processors, cause the one or more processors to perform:
comparing a structure of a first sub-tree, of a plurality of sub-trees associated with a template, with a structure of a second sub-tree of the plurality of sub-trees, wherein the first sub-tree and the second sub-tree are not structurally identical;
determining a degree of structural similarity between the first sub-tree and the second sub-tree; and
in response to determining that the degree of structural similarity is more than a specified threshold, generalizing the structure of the first sub-tree to generate a modified first sub-tree in the template, wherein the structure of the modified first sub-tree matches the structure of first sub-tree and the structure of the second sub-tree.

21. The non-transitory computer-readable storage medium of claim 20, further comprising instructions for determining a co-efficient of similarity between sub-trees in the plurality of sub-trees.

* * * * *